(12) United States Patent
Tabet et al.

(10) Patent No.: US 9,445,429 B2
(45) Date of Patent: Sep. 13, 2016

(54) CONTROL SIGNALING OPTIMIZATION FOR LTE COMMUNICATIONS

(71) Applicant: Apple Inc., Cupertino, CA (US)

(72) Inventors: Tarik Tabet, San Jose, CA (US); Vinay R. Majjigi, Cupertino, CA (US); Christian W. Mucke, Sunnyvale, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 14/502,507

(22) Filed: Sep. 30, 2014

(65) Prior Publication Data

US 2015/0092647 A1 Apr. 2, 2015

Related U.S. Application Data

(63) Continuation of application No. 14/500,917, filed on Sep. 29, 2014.

(60) Provisional application No. 61/884,916, filed on Sep. 30, 2013.

(51) Int. Cl.
| | |
|---|---|
| *H04W 52/00* | (2009.01) |
| *H04W 52/02* | (2009.01) |
| *H04W 72/12* | (2009.01) |
| *H04W 28/02* | (2009.01) |
| *H04L 5/00* | (2006.01) |

(52) U.S. Cl.
CPC ........ *H04W 72/1289* (2013.01); *H04L 5/0044* (2013.01); *H04L 5/0053* (2013.01); *H04W 28/0221* (2013.01); *Y02B 60/50* (2013.01)

(58) Field of Classification Search
CPC H04W 52/00; H04W 52/02; H04W 52/0216

USPC .......................................................... 370/311
See application file for complete search history.

(56) References Cited

U.S. PATENT DOCUMENTS

| | | |
|---|---|---|
| 2003/0117969 A1 | 6/2003 | Koo et al. |
| 2010/0290419 A1 | 11/2010 | Wengerter |
| 2011/0103289 A1* | 5/2011 | Josiam ................ H04W 72/005 370/312 |
| 2011/0151913 A1* | 6/2011 | Forster .................... H04W 4/20 455/509 |
| 2011/0199986 A1* | 8/2011 | Fong ..................... H04L 5/0035 370/329 |
| 2012/0275366 A1 | 11/2012 | Anderson et al. |
| 2013/0039272 A1 | 2/2013 | Chen |
| 2013/0114528 A1 | 5/2013 | Chen et al. |
| 2014/0328260 A1 | 11/2014 | Papasakellariou et al. |

(Continued)

*Primary Examiner* — Ronald B Abelson
(74) *Attorney, Agent, or Firm* — Downey Brand LLP

(57) ABSTRACT

The disclosure describes procedures for including downlink control information (DCI) within a physical downlink shared channel (PDSCH) communication to reduce power consumption for a user equipment (UE) operating in a Long Term Evolution (LTE) network. A network apparatus can be configured to identify an expected DCI change for the UE, determine whether an LTE subframe location for the DCI change is known, generate either a general or a specific DCI change indicator, and send the corresponding DCI change indicator to the UE on the PDSCH. The specific DCI change indicator can include a bitmap identifying a particular upcoming LTE subframe where the UE is required to decode the PDCCH for DCI, and the general DCI change indicator can include a bit flag identifying a time associated with one or more upcoming LTE subframes when the UE should decode the PDCCH for DCI.

20 Claims, 13 Drawing Sheets

(56) References Cited

U.S. PATENT DOCUMENTS

| | | | |
|---|---|---|---|
| 2015/0003301 A1* | 1/2015 | He | H04B 7/0452 370/280 |
| 2015/0009874 A1 | 1/2015 | Edara et al. | |
| 2015/0092563 A1* | 4/2015 | Tabet | H04W 28/0221 370/241 |
| 2015/0092646 A1* | 4/2015 | Tabet | H04W 28/0221 370/311 |

* cited by examiner

CONTROL SIGNALING OPTIMIZATION FOR LTE COMMUNICATIONS

CROSS REFERENCE TO RELATED APPLICATION(S)

This application is a continuation of U.S. application Ser. No. 14/500,917, filed on Sep. 29, 2014, and entitled "CONTROL SIGNALING OPTIMIZATION FOR LTE COMMUNICATIONS," which claims priority under 35 U.S.C. 119(e) to U.S. Provisional Application No. 61/884,916, filed on Sep. 30, 2013, and entitled "CONTROL SIGNALING OPTIMIZATION FOR LTE COMMUNICATIONS," the contents of which are incorporated herein by reference in their entirety for all purposes.

FIELD

The described embodiments generally relate to wireless communications and more particularly to procedures for mitigating problems associated with downlink control channel monitoring that result in unnecessary power consumption at user equipment.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the bandwidth requirements of multi-carrier systems that cumulatively achieve data rates not possible by predecessor LTE versions. In 3GPP LTE, an LTE carrier is limited to communicating at various designated system bandwidths ranging from 1.4 MHz up to 20 MHz.

For LTE-A carriers, interoperability with LTE carriers dictates that an LTE-A carrier must employ a system bandwidth equivalent to its LTE counterparts. As such, the peak single-carrier LTE-A system bandwidth is capped at 20 MHz for inter-LTE RAT compatibility. However, in a multiple CC scenario, an aggregated set of LTE-A carriers may be able to achieve cumulative bandwidths of up to 100 MHz within various allocated spectrum bands. Generally, user equipment (UEs) operating within an LTE cell or an LTE-A cell employ operating bandwidths to mirror a serving cell's system bandwidth; this implementation ensures that sufficient radio resources are allocated to support different UE data type communications.

For instance, when a UE attempts to decode control information of various wide-band communication channels, such as the physical downlink control channel (PDCCH), the UE will typically employ an operating bandwidth of 10 MHz or 20 MHz to decode the PDCCH. Control information carried in the PDCCH is referred to as downlink control information (DCI). The DCI may include downlink (DL) assignment (e.g., resource allocations of the physical downlink shared channel or PDSCH), as well as, uplink (UL) resource grant information (e.g., resource allocations of the physical uplink shared channel or PUSCH), transmit power control information, etc. An LTE or LTE-A base station (i.e., an eNodeB) may designate a PDCCH format according to its DCI information, which can be directed at a single UE or to multiple UEs residing within the same cell. For instance, PDCCH DCI may be associated with a cell radio network temporary identifier (C-RNTI) directed at a single UE, or alternatively, PDCCH DCI may be associated with a paging RNTI (P-RNTI) or a system information RNTI (SI-RNTI) directed at a group of UEs located within the same cell.

Unfortunately, LTE carriers can require UEs to perform blind decoding of the PDCCH to attempt to locate DCI control information intended for a specific UE and/or for a group of UEs operating within the same network cell (e.g., as indicated by an RNTI designation). For example, a UE may be required to perform blind decoding in scenarios where the UE is not aware of a carrier's PDCCH control channel structure, associated with the quantity of PDCCH control channels and the number of control channel elements (CCEs) to which each control channel is mapped. In these situations, a UE that performs blind decoding to attempt to locate the PDCCH and acquire its DCI are faced with the problem of exhausting UE device resources (e.g., battery power, processor and memory resources, etc.) to perform unnecessary PDCCH searches, particularly when a UE is engaged in low-bandwidth, periodic communications, such as voice over LTE (VoLTE) communications that could otherwise allow a UE to operate in a power conservation mode.

Further, as is understood by those skilled in the art, the PDCCH is a wide-band communication channel that occupies the entire system bandwidth. As such, when a UE decodes the PDCCH for control information that has a relatively low resource block requirement, communication resources may be wasted. In this regard, it would be beneficial for a UE to be able to employ its radio frequency (RF) filter to decode a narrow-band channel communication channel (e.g., the PDSCH) for control information. In this manner, an RF filter can be configured to match the bandwidth of narrow-band channel, as opposed to an entire system bandwidth.

Accordingly, there exists a need for solutions that can conserve local UE device resources and reduce network signaling required when a UE attempts to monitor DCI information to acquire DL resource assignments and UL resource grants.

SUMMARY

In various embodiments of the disclosure, a procedure for reducing power consumption at a user equipment (UE) communicating in a Long Term Evolution (LTE) network is discussed. In some implementations, a network apparatus can be configured to identify an expected downlink control information (DCI) change for the UE, determine whether an LTE subframe location for the DCI change is known, generate a DCI change indicator based on whether or not the DCI change is known, and then send the DCI change indicator to the UE on a physical downlink shared channel (PDSCH) to instruct the UE where to decode a physical downlink control channel (PDCCH) for a DCI. In various configurations, the DCI change indication sent to the UE on the PDSCH may be embedded within physical layer (PHY) bits, within a medium access control (MAC) layer control element (CE), or within an LTE radio resource control (RRC) signal.

In some aspects of the disclosure, when the LTE subframe location for the DCI change is not known, the network apparatus can generate a general DCI change indicator for the UE, where the general DCI change indicator is sent to the UE as a bit flag identifying a time associated with one or more upcoming LTE subframes when the UE is required to decode the PDCCH for the DCI, or alternatively, where the general DCI change indicator is sent to the UE as a bit flag including an open indication that requires the UE to decode the PDCCH at least until the DCI is acquired by the UE.

In other aspects of the disclosure, when the LTE subframe location for the DCI change is known, the network apparatus can generate a precise DCI change indicator for the UE, where the precise DCI change indicator is sent to the UE as a bitmap identifying a particular upcoming LTE subframe where the UE is required to decode the PDCCH for the DCI.

In some implementations, the DCI change indicator can be sent to the UE within a payload portion of a PDSCH communication, and the DCI may correspond to a voice over LTE (VoLTE) data or a best effort (BE) data network allocation change for the UE. Further, the DCI change indicator can be configured to identify one or more upcoming LTE subframes that occur during an ON duration of a connected mode discontinuous reception (C-DRX) cycle of the UE.

In various embodiments, a mobile device can comprise at least one wireless radio transceiver that is configurable to communicate via an LTE network, one or more processors, and a storage device. The storage device can store executable instructions that, when executed by the one or more processors, cause the mobile device to decode a PDSCH, acquire a DCI change indicator from a payload portion of a PDSCH communication, and decode a PDCCH for a DCI based on the DCI change indicator.

In some aspects, the DCI change indicator can be a general DCI change indicator that: identifies a time associated with one or more upcoming LTE subframes when the mobile device is required to decode the PDCCH for the DCI, or includes an open indication requiring the mobile device to decode the PDCCH at least until the DCI is acquired by the mobile device. In other aspects, the DCI change indicator can be a specific DCI change indicator that includes a bitmap identifying a particular upcoming LTE subframe where the mobile device is required to decode the PDCCH for the DCI.

In one configuration, the mobile device can include a PDCCH timer, and execution of the executable instructions can further cause the mobile device to start the PDCCH timer to designate a do-not-decode period that prevents the mobile device from decoding the PDCCH during the do-not-decode period, determine when the PDCCH timer has expired, and subsequently, decode the PDCCH until the PDCCH timer is restarted.

Additionally, an execution of the executable instructions may further cause the mobile device to receive a new DCI change indicator on the PDSCH during the do-not-decode period, and in response, decode the PDCCH during the do-not-decode period in accordance with the DCI change indicator.

In other embodiments, a non-transitory computer-readable medium storing executable instructions that, when executed by one or more processors of a network apparatus, can cause the network apparatus to identify an expected DCI change for a mobile device, determine whether an LTE subframe location for the DCI change is known, generate a DCI change indicator (e.g., a general DCI change indicator or a precise DCI change indicator), and then send the corresponding DCI change indicator to the mobile device on the PDSCH to instruct the mobile device where to decode the PDCCH for a DCI.

In some scenarios, the corresponding DCI change indicator can identify one or more upcoming LTE subframes that occur during an ON duration of a connected mode discontinuous reception (C-DRX) cycle of the mobile device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
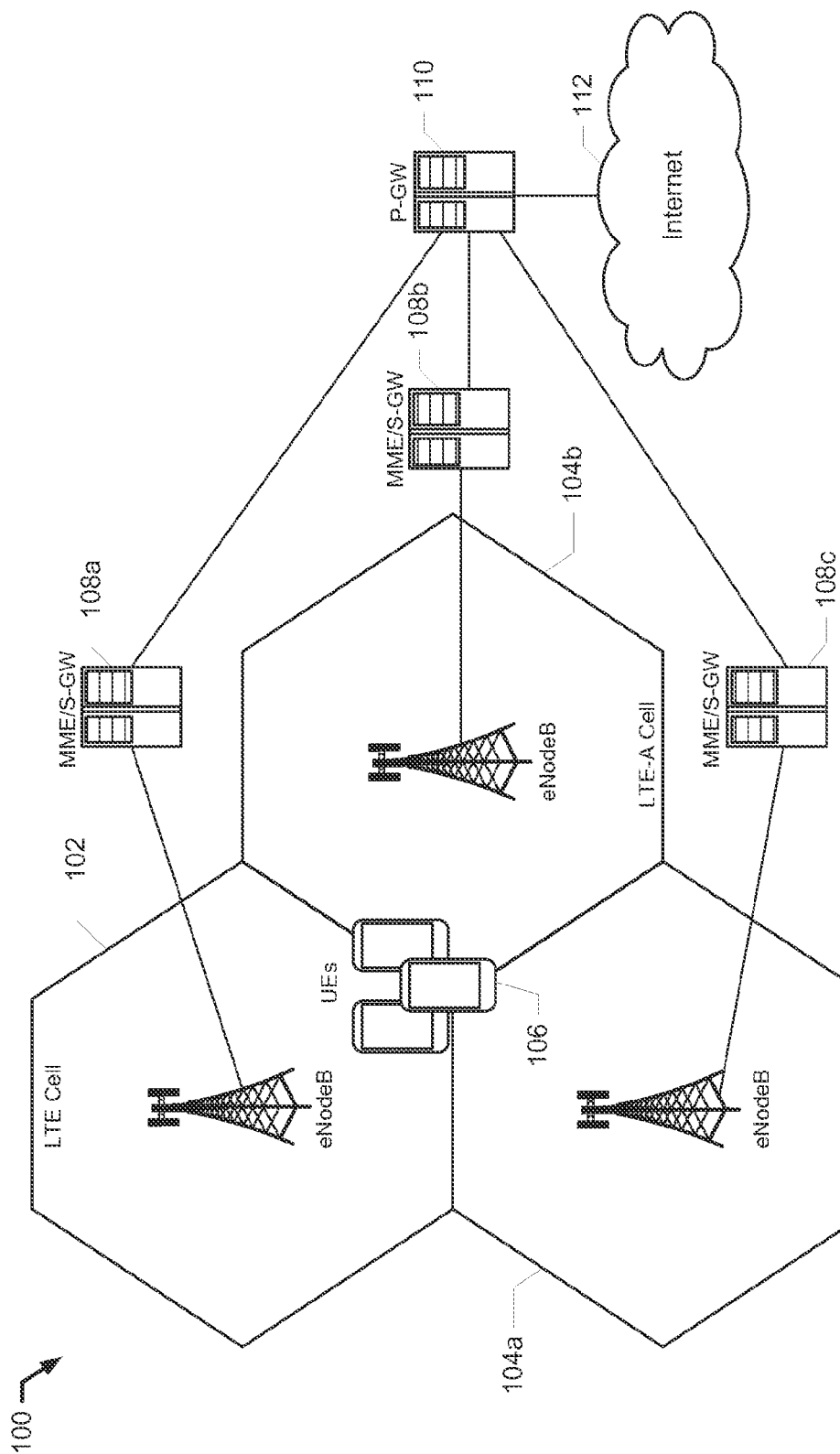
FIG. 1 illustrates a wireless communication system including Long Term Evolution (LTE) and LTE Advanced (LTE-A) network cells supporting multiple user equipment devices (UEs) that may be configured to monitor various communication channels for control signaling information, in accordance with some embodiments of the disclosure.

Representative examples and implementations for designating physical downlink control channel (PDCCH) or physical downlink shared channel (PDSCH) decode periods, and for performing downsampled PDSCH decoding at a user equipment (UE), are described within this section. These examples are provided to add context to, and to aid in the understanding of, the subject matter of this disclosure. It should be apparent to one having ordinary skill in the art that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11 ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 depicts a wireless communication system 100 that is compliant with the 3GPP Evolved Universal Terrestrial Radio Access (E-UTRA) air interface, and includes, but is not limited to, one LTE network cell 102 and two LTE-A network cells 104*a-b*, respectively having enhanced NodeB (eNodeB) base stations that can communication between and amongst each other via an X2 interface. Further, the E-UTRA compliant communication system 100 can include any number of mobility management entities (MMEs) 108*a-c*, serving gateways (S-GWs) 108*a-c*, PDN gateways (P-GWs) 110, etc., which, as part of the evolved packet core (EPC), can communicate with any of the LTE and LTE-A cell eNodeBs, 102 and 104*a-b*, via an S1 interface. Additionally, the EUTRA communication system 100 can include any number of UEs that may be provided wireless communications service by one or more of the eNodeBs of the LTE and LTE-A cells, 102 and 104*a-b*, at any particular time.

By way of example, a UE 106 may be located within an LTE-A cell 104*a-b* and in an LTE radio resource control (RRC) Connected mode when it initiates a voice over LTE (VoLTE) application to establish a voice call. The UE 106 running the VoLTE application can place a VoLTE voice call to an intended recipient by communicating voice data to a serving eNodeB 104*a-b*, which forwards the call through the EPC, 108*a-c* and 110, and thereby connects to the Internet 112 to transfer the VoLTE communications through an IP Multimedia Subsystem (IMS) network between the caller UE 106 and a receiving device of the intended recipient, which may be a part of a remote network. Alternatively, the UE 106 can initiate any number of different UE-resident applications that may be respectively associated with a particular data type, e.g., streaming audio data, streaming audio-video data, website data, text data, etc., to attempt to transfer IP-based application data via its serving LTE network 104a-b over the Internet 112.

Depending on the data type of a corresponding UE application, a network resource requirement (e.g., associated with network resource blocks or RBs) for communicating the application data may be minimal (e.g., for text or voice data), moderate (e.g., for website webpage data), or substantial (e.g., for streaming audio-video data). Consequently, in some embodiments, a first UE application may be associated with a low-bandwidth data type (e.g., VoLTE-type data); whereas, in other embodiments, a second UE application may be associated with a moderate to high-bandwidth data type (e.g., streaming audio or video data). In some implementations, custom control signaling optimizations can be employed to mitigate problems associated with unnecessary power consumption at a UE when the UE attempts to monitor downlink communication channels (e.g., the PDCCH or the PDSCH) for information associated with various network resource grants/allocations during an LTE RRC Connected mode, based on a duty cycle associated with a particular UE application.

Figure 2:
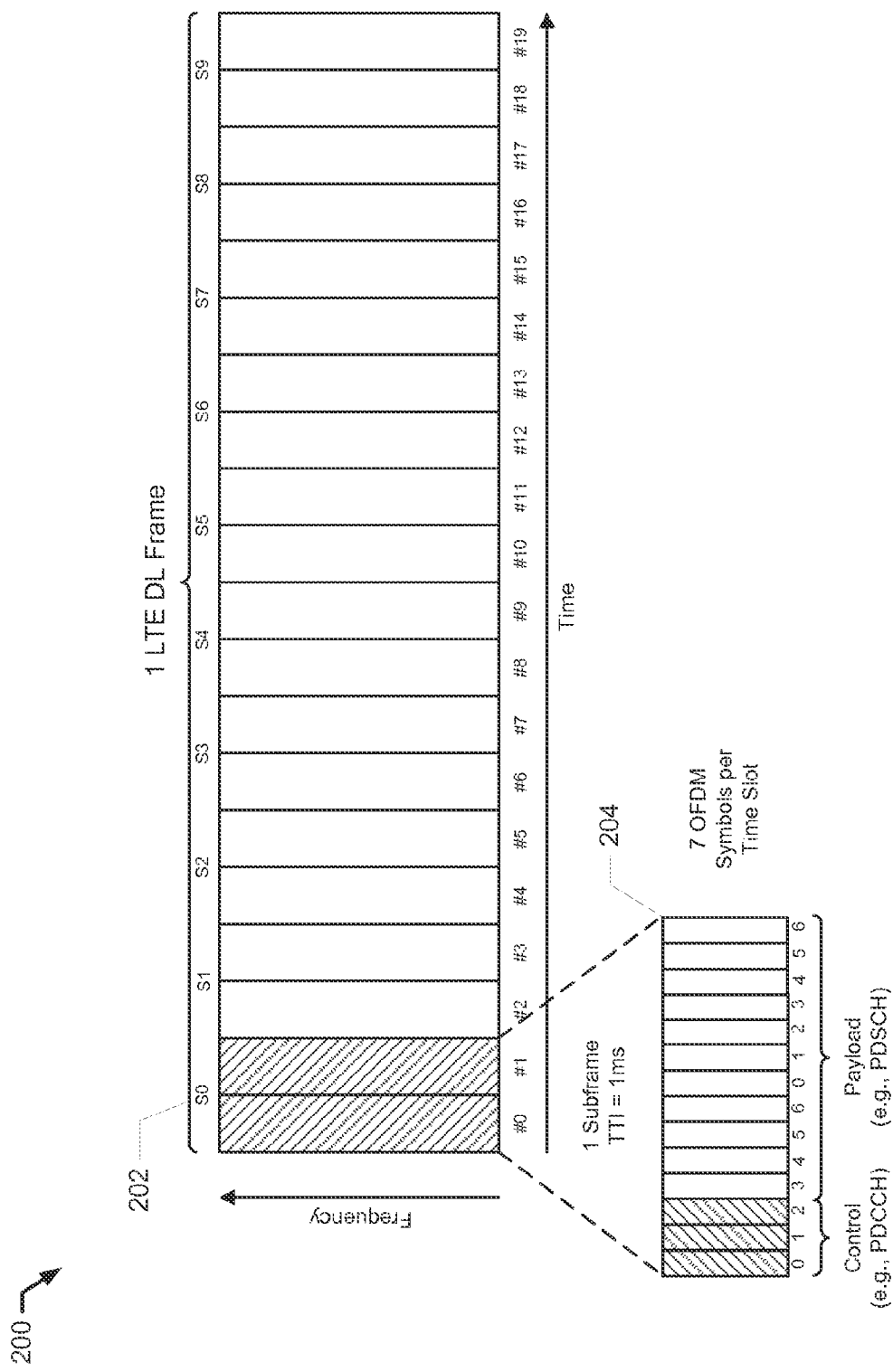
FIG. 2 illustrates a block diagram depicting a single LTE downlink (DL) data frame structure in accordance with various implementations of the disclosure.

FIG. 2 illustrates a block diagram 200 depicting a single LTE downlink (DL) data frame structure 202 in accordance with various implementations of the disclosure. As would be understood by those skilled in the art, one LTE data frame 202 includes 10 subframes, labeled S0 through S9, respectively having a transmission time interval (TTI) of 1 ms. each. Each LTE subframe is composed of two time slots having a TTI of 0.5 ms. each. Accordingly, there are 20 time slots, labeled #0 through #19, within each LTE data frame 202. For instance, the first subframe S0 204 of the LTE data frame 202 may be composed of 14 orthogonal frequency division multiplexing (OFDM) symbols, which equates to 7 OFDM symbols per time slot, #0 and #1, of subframe S0 204.

A first portion of the OFDM symbols (e.g., the first three OFDM symbols) of subframe S0 204 may be designated for control signaling information (e.g., downlink control information (DCI) associated with the PDCCH), and the remaining portion of the OFDM symbols of subframe S0 204 may be designated for payload data (e.g., payload data associated with the PDSCH). It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of 5 µs., or an extended CP having a duration of 17 µs. Therefore, an LTE slot employing a normal CP will typically have 7 OFDM symbols; whereas an LTE slot employing an extended CP (e.g., intended for use in larger suburban cells) will typically have 6 OFDM symbols. An LTE resource block (RB) is typically associated with 12 OFDM subcarriers transmitting for the duration of one LTE slot. Accordingly, a normal RB (associated with a normal CP) transmitting for 0.5 ms. will comprise 84 OFDM symbols (12 subcarriers×7 OFDM symbols) or resource elements (REs). Likewise, an extended RB (associated with an extended CP) transmitting for 0.5 ms. will comprise 72 REs (12 subcarriers×6 OFDM symbols).

In various embodiments, an LTE-A cell 104a-b may employ multiple component carriers (CCs), in aggregate, to achieve cumulative bandwidths of up to 100 MHz within various allocated network spectrum bands. A corresponding LTE-A cell may comprise an eNodeB that can designate a PDCCH format according to its DCI information, which can be directed at a single UE 106 or multiple UEs 106 residing within the same network cell 104a-b. For instance, PDCCH DCI may be associated with a cell radio network temporary identifier (C-RNTI) directed at a single UE 106, or alternatively, PDCCH DCI may be associated with a paging RNTI (P-RNTI) or a system information RNTI (SI-RNTI) directed at a group of UEs 106 located within the same cell 104a-b. In various embodiments, the DCI of a PDCCH may include downlink (DL) grant information (e.g., resource allocations of the physical downlink shared channel or PDSCH), as well as, uplink resource grant information (e.g., resource allocations of the physical uplink shared channel or PUSCH), Tx power control information, etc.

Figure 3:
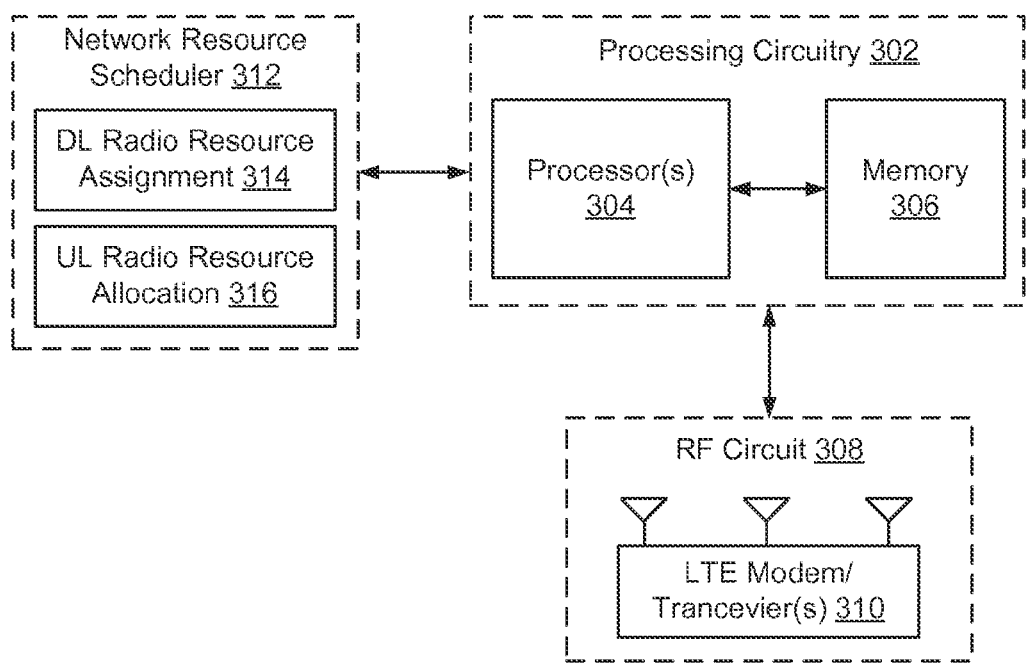
FIG. 3 illustrates a block diagram of a network device including a network resource scheduler having a DL radio resource assignment module and an uplink (UL) radio resource allocation module in accordance with some embodiments.

FIG. 3 illustrates a block diagram of a network apparatus 300 (e.g., an LTE eNodeB having RRC functionality) with a network resource scheduler 312 having both a downlink (DL) radio resource assignment component 314 and an uplink (UL) radio resource allocation component 316 (e.g., for generating various UL grants) in accordance with various embodiments of the disclosure. In some implementations, the network resource scheduler 312 can be configured to utilize its DL radio resource assignment component 314 to generate and/or issue various DL radio resource assignments (e.g., carrier DL RB grants) to one or more UEs located within its corresponding network cells (e.g., within an LTE cell 102 or within an LTE-A cell 104a-b). In this context, the network resource scheduler 312 may be able to determine which UEs 106 should receive PDCCH and PDSCH transmissions and on what RBs during each TTI. In some scenarios, DL radio resource assignments may be included within a DCI of a PDCCH, or alternatively, within a DCI of a PDSCH.

In certain situations, the DCI may be directed to a single UE or to multiple UEs within the same network cell. Further, in either scenario, the DCI may include DL resource scheduling information pertaining to a single network component carrier, or alternatively, the DCI may include DL resource scheduling information pertaining to multiple network component carriers (e.g., in cells employing LTE-A carrier aggregation 104a-b). In various embodiments, the DCI may include a downlink assignment index (DAI) for each cell 102 or 104a-b being scheduled by the network resource scheduler 312 employing the downlink (DL) radio resource assignment component 314. Additional functionality of the network resource scheduler 312 will be made apparent by the ensuing discussion of various embodiments of the disclosure, such as that described in association with the resource scheduling and decoding procedures 500, 600, 700, 1000, and 1200 respectively depicted in FIGS. 5-7, 10, and 12.

In some configurations, the network apparatus 300 can include processing circuitry 302 that can perform various network resource scheduling actions in accordance with one or more embodiments disclosed herein. In this regard, the processing circuitry 302 can be configured to perform and/or control performance of one or more functionalities of the network apparatus 300 in accordance with various implementations, and thus can provide functionality for performing DL radio resource assignments, and other communication procedures of the network apparatus 300 in accordance with various embodiments. The processing circuitry 302 may further be configured to perform data processing, application execution and/or other control and management functions according to one or more embodiments of the disclosure.

The network apparatus 300 or portions or components thereof, such as the processing circuitry 302, can include one or more chipsets, which can respectively include any number of coupled microchips thereon. The processing circuitry 302 and/or one or more other components of the network apparatus 300 may also be configured to implement functions associated with various network resource scheduling procedures of the disclosure using multiple chipsets. In some scenarios, the network apparatus 300 may be associated with or employed as an eNodeB of an LTE 102 or an LTE-A cell 104a-b to operate within the wireless communication system 100 of FIG. 1. In this implementation, the network apparatus 300 may include one or more chipsets configured to enable the apparatus to operate within the wireless communication system 100 as a network base station, providing wireless communications service to any number of UEs 106 located within its corresponding wireless coverage area.

In some scenarios, the processing circuitry 302 of the network apparatus 300 may include one or more processor (s) 304 and a memory component 306. The processing circuitry 302 may be in communication with, or otherwise coupled to, a radio frequency (RF) circuit 308 having an LTE compliant modem and one or more wireless communication transceivers 308. In some implementations, the RF circuit 308 including the modem and the one or more transceivers 310 may be configured to communicate using different LTE RAT types. For instance, in some embodiments the RF circuit 308 may be configured to communicate using an LTE RAT, and in other embodiments, the RF circuit 308 may be configured to communicate using an LTE-A RAT.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 304 can be coupled to and/or configured in operative communication with each other and these components may be collectively configured to perform one or more procedures of the network apparatus 300 as described herein in the form of an eNodeB having RRC control functionality.

In some implementations, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 of the processing circuitry 302 may be capable of performing operations according to various implementations described herein when configured accordingly.

In various embodiments, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal program executions. In this regard, the memory 306 can be configured to store information, data, applications, instructions, or the like, for enabling the network apparatus 300 to carry out various functions in accordance with one or more embodiments of the disclosure. In some implementations, the memory 306 may be in communication with, and coupled to, the processor(s) 304 of the processing circuitry 302, as well as one or more system buses for passing information between and amongst the different device components of the network apparatus 300.

It should be appreciated that not all of the components, device elements, and hardware illustrated in and described with respect to the network apparatus 300 of FIG. 3 may be essential to this disclosure, and thus, some of these items may be omitted, consolidated, or otherwise modified within reason. Additionally, in some implementations, the subject matter associated with the network apparatus 300 can be configured to include additional or substitute components, device elements, or hardware, beyond those that are shown within FIG. 3.

Figure 4:
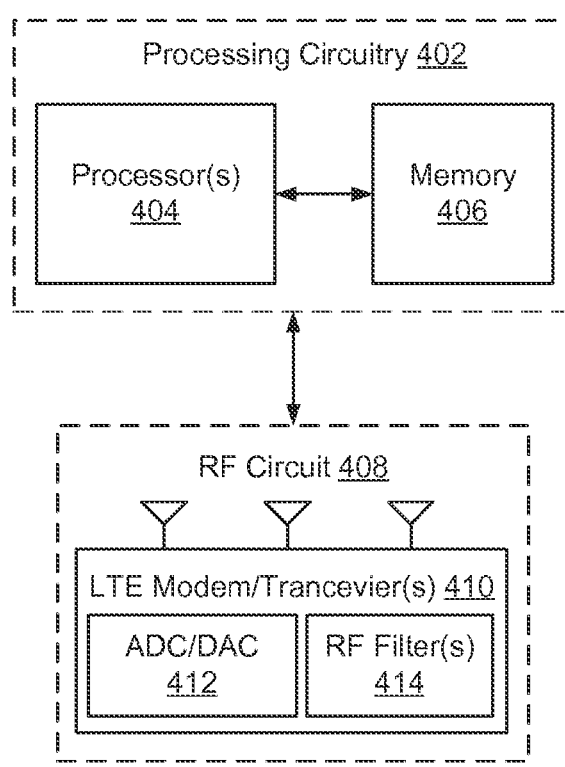
FIG. 4 illustrates a block diagram of a communication device including a radio frequency (RF) circuit having a transceiver(s) and a modem with analog-to-digital and digital-to-analog converters (ADC/DAC) and an RF filter(s) in accordance with some implementations.

FIG. 4 illustrates a block diagram of a communication device 400 (e.g., an LTE compliant UE) including an RF circuit 408 having one or more transceiver(s) and a modem 410 with analog-to-digital and digital-to-analog converters (ADC/DAC) 412 and one or more RF filter(s) 414 in accordance with some embodiments. In certain implementations, the RF filter(s) 414 can be configured to span a sufficient bandwidth to receive data of an entire wide-band communication channel, e.g., data associated with the PDCCH, or alternatively, the RF filter(s) 414 can be configured to span a narrower bandwidth to receive a particular sub-band of data of a narrow-band communication channel, e.g., data associated with the PDSCH.

Further, in scenarios where the communication device 400 attempts to establish a lower sampling rate e.g., for PDSCH decoding (described in further detail herein with respect to FIGS. 7-9) in an effort to conserve power, the ADC 412 can be configured with a narrower operational bandwidth matching a 3GPP LTE standard compliant bandwidth of 15, 10, 5, 3, or 1.4 MHz. In various embodiments, the selection of the ADC's 412 operational bandwidth, allowing the ADC 412 to operate at a substantially downsampled sampling rate, may be dependent upon a data type being communicated and received by the communication device 400.

In some configurations, the communication device 400 can include processing circuitry 402 that can perform various RF filtering, downsampling, and PDCCH or PDSCH decoding actions in accordance with one or more embodiments disclosed herein. In this regard, the processing circuitry 402 can be configured to perform and/or control performance of one or more functionalities of the communication device 400 in accordance with various implementations, and thus can provide functionality for performing DL channel decoding, and other communication procedures of the communication device 400 in accordance with various embodiments. The processing circuitry 402 may further be configured to perform data processing, application execution and/or other control and management functions according to one or more embodiments of the disclosure.

The communication device 400 or portions or components thereof, such as the processing circuitry 402, can include one or more chipsets, which can respectively include any number of coupled microchips thereon. The processing circuitry 402 and/or one or more other components of the communication device 400 may also be configured to implement functions associated with various device power conservation procedures of the disclosure using multiple chipsets. In some scenarios, the communication device 400 may be associated with or employed as a multi-mode UE 106 of an LTE 102 or an LTE-A cell 104a-b to operate within the wireless communication system 100 of FIG. 1. In this implementation, the communication device 400 may include one or more chipsets configured to enable the apparatus to communicate within the LTE or LTE-A cells, 102 and 104a-b, of the wireless communication system 100.

In some scenarios, the processing circuitry 402 of the communication device 400 may include one or more processor(s) 404 and a memory component 406. The processing circuitry 402 may be in communication with, or otherwise coupled to, a radio frequency (RF) circuit 408 having an LTE compliant modem and one or more wireless communication transceivers 408. In some implementations, the RF circuit 408 including the modem and the one or more transceivers 410 may be configured to communicate using different LTE RAT types. For instance, in some embodiments the RF circuit 408 may be configured to communicate using an LTE RAT, and in other embodiments, the RF circuit 408 may be configured to communicate using an LTE-A RAT.

In various embodiments, the processor(s) 404 may be configured and/or employed in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 can be coupled to and/or configured in operative communication with each other and these components may be collectively configured to perform one or more procedures of the communication device 400 as described herein in the form of an LTE compliant UE 106.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device 400 to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device 400.

It should be appreciated that not all of the components, device elements, and hardware illustrated in and described with respect to the communication device 400 of FIG. 4 may be essential to this disclosure, and thus, some of these items may be omitted, consolidated, or otherwise modified within reason. Additionally, in some implementations, the subject matter associated with the communication device 400 can be configured to include additional or substitute components, device elements, or hardware, beyond those depicted within FIG. 4.

Figure 5:
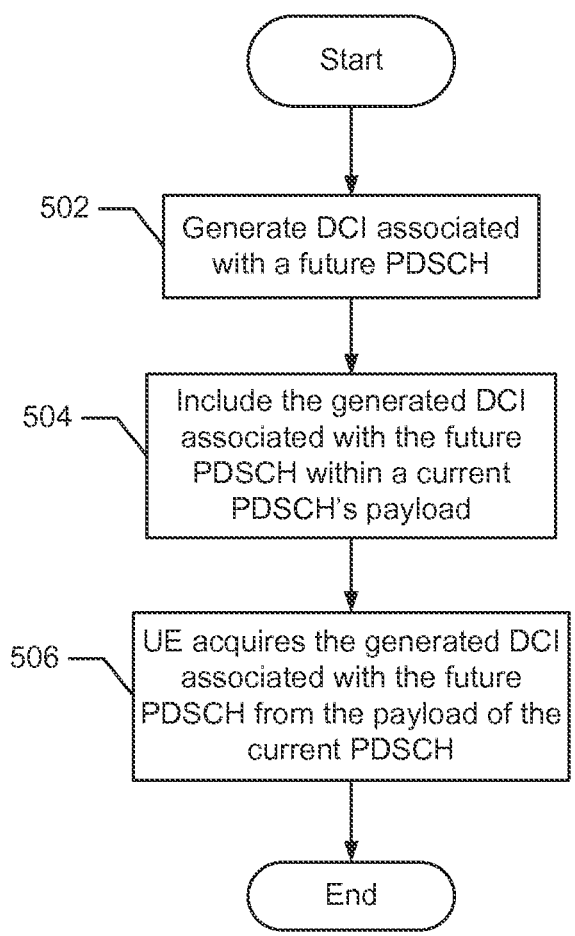
FIG. 5 illustrates a flowchart associated with example methods for including downlink control information (DCI) within a physical downlink shared channel (PDSCH) payload according to some embodiments.

FIG. 5 illustrates a flowchart depicting procedures 500 for including DCI information associated with a future PDSCH within a payload of a current PDSCH according to some embodiments of the disclosure. It should be understood that any of, or all of, the procedures 500 depicted in FIG. 5 may be associated with a method, or methods, that can be implemented by the execution of computer program instructions stored on a non-transitory computer-readable memory 306 of a network apparatus 300, and optionally, in conjunction with the execution of computer program instructions stored on a non-transitory computer-readable memory 406 of a user communication device 400.

Initially, at operation block 502, a network apparatus 300 (e.g., an eNodeB having RRC functionality) can generate DCI information (e.g., including various DL RB assignments) associated with a future PDSCH. Subsequently, at operation block 504, the network apparatus 300 can include the DCI information associated with a future PDSCH within the payload of a current PDSCH. In some embodiments, the network resource scheduler 312 may employ its DL radio resource assignment component 314 to make a determination of when a particular PDSCH allocation size permits inclusion of DCI information pertaining to a future PDSCH within the payload of a current or upcoming PDSCH.

In various scenarios, the DCI associated with a future PDSCH may be included within the current PDSCH payload at a specific, reserved RB location. Alternatively, the DCI associated with a future PDSCH can be allocated to a variable RB location within the current PDSCH's payload that may correspond to a dynamic RB assignment made by a network apparatus 300, such as an eNodeB. Subsequently, at operation block 506, a UE 400 can acquire/decode the generated DCI corresponding to the future PDSCH from the payload of the current PDSCH to obtain various RB assignments for the future PDSCH. In some implementations the DCI information in a current PDSCH payload may include DL grant information relating to RB allocations for the PDSCH of subsequent LTE subframes.

When DCI information of a future PDSCH is included within a current PDSCH's payload, a UE 400 need not perform blind decoding of the PDCCH to obtain the DCI information. In this regard, the UE 400 need not decode a wide-band channel (i.e., the PDCCH), as the PDSCH is a narrow-band channel. In various embodiments that will be described further herein with respect to FIGS. 7-9, the UE 400 may be configured to advantageously employ an operating bandwidth that is substantially narrower than a corresponding cell's system bandwidth to decode a narrow-band PDSCH for the DCI and the PDSCH payload. In this scenario, a smaller number of radio RBs may be required during downsampled PDSCH decoding activities. Further, by encoding the DCI within the payload of the PDSCH, a UE 400 may be able to realize a significant amount of power savings when it performs decoding operations of the narrow-band PDSCH.

Figure 6:
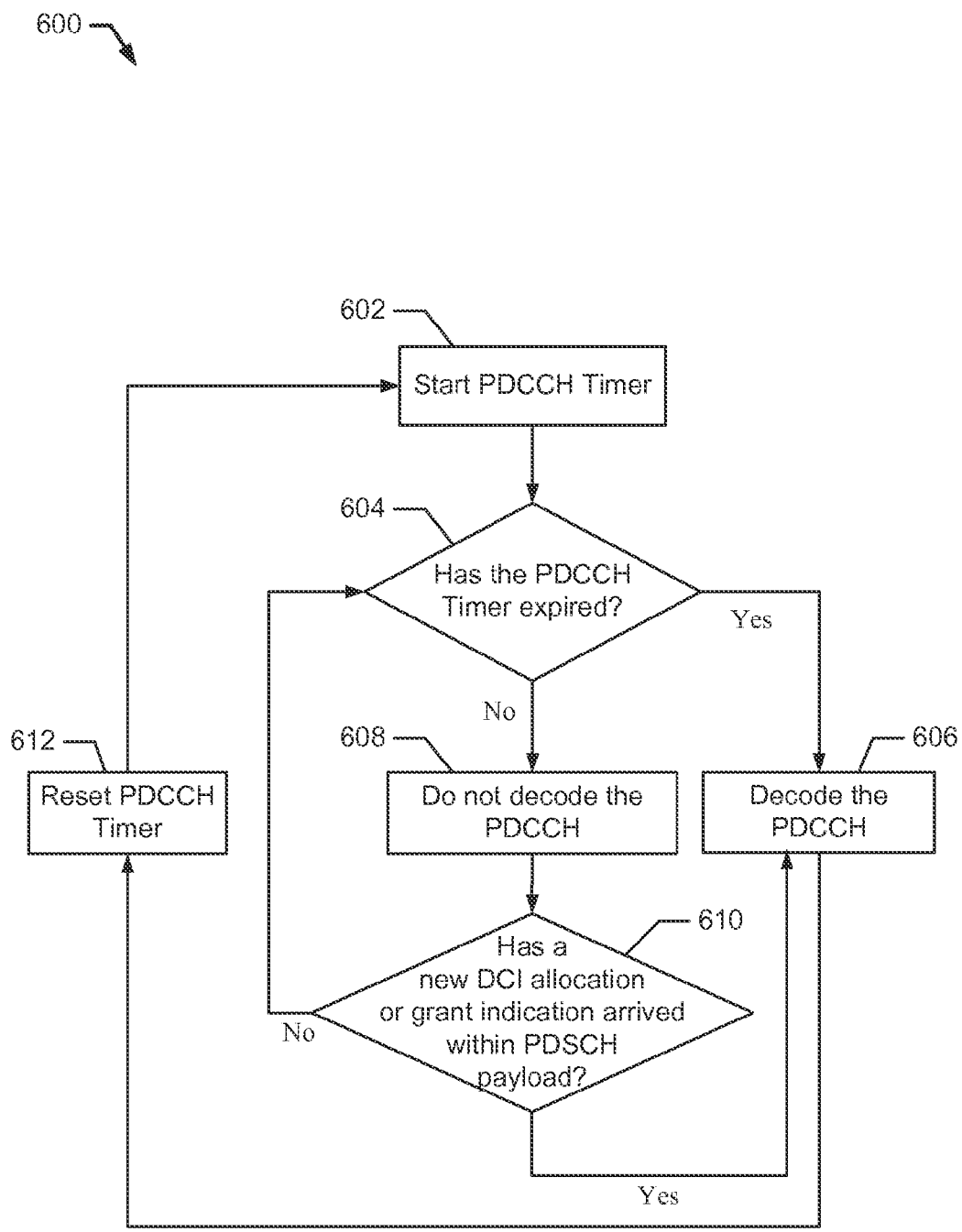
FIG. 6 illustrates a flowchart associated with example operations of a physical downlink control channel (PDCCH) timer for designating various PDCCH "do not decode" periods in accordance with some implementations.

FIG. 6 illustrates a flowchart depicting operations 600 of a PDCCH timer for designating various PDCCH "do not decode" periods associated with time when a UE 400 will not attempt to decode the PDCCH for DCI information, in accordance with some implementations of the disclosure. It should be understood that any of, or all of, the operations 600 depicted in FIG. 6 may be associated with a method, or methods, that can be implemented by the execution of computer program instructions stored on a non-transitory computer-readable memory 306 of a network apparatus 300, and optionally, in conjunction with the execution of computer program instructions stored on a non-transitory computer-readable memory 406 of a user communication device 400.

At operation block 602, the PDCCH timer is initiated e.g., during an RRC Connected mode communications of an LTE-enabled communication device 400. In some implementations the PDCCH timer may be employed in conjunction with a discontinuous reception (DRX) mode of a UE 400; whereas, in other scenarios, the PDCCH timer may be employed independent from any DRX activities. In either situation, the PDCCH timer may be configured to specify a number of consecutive TTIs during which a UE 400 does not monitor the PDCCH for resource assignments. Further, the PDCCH timer may be initiated by a serving network apparatus 300, such as an LTE or LTE-A compliant eNodeB, or alternatively, the PDCCH timer may be triggered in response to an eNodeB or a UE 400 detecting the occurrence of one or more predefined network conditions (e.g., DL transmission, DL resource grant, etc.).

After the PDCCH timer has been initiated, at operation block 602, a UE 400 may be instructed not to decode the PDCCH to detect DCI information, at operation block 608. In various embodiments, this "do not decode" instruction remains valid for the entire duration of the PDCCH timer. In other embodiments, the "do not decode" instruction may only remain valid for a limited duration of the PDCCH timer, where the PDCCH timer may be cut off by another superseding network instruction (e.g., by RRC signaling, HARQ operations, or various other MAC control elements). After a period of time associated with the duration of the PDCCH timer has elapsed (e.g., when the PDCCH timer has expired), at decision block 604, the UE 400 can be instructed to decode the PDCCH for DCI information for at least a period of time or for a designated number of LTE subframes. In various implementations, in conjunction with a DRX mode of operation, the PDCCH timer may be defined in terms of DRX cycles.

Following the original PDCCH timer cycle, the PDCCH timer may be reset at operation block 612, and subsequently the reset PDCCH timer may again be initiated at operation block 602 to establish a new "do not decode" time period. In some embodiments, a new DCI allocation or grant indication may arrive, at decision block 610, at which point the PDCCH will be decoded at operation block 606. Thereafter, at operation block 612 the PDCCH timer may be reset to allow a reinitiated PDCCH timer to designate a new PDCCH "do not decode" time period, during which a UE 400 would be instructed not to decode the PDCCH for DCI information. In various embodiments, the PDCCH timer interval(s) may be set by a network apparatus 300, such as an eNodeB.

Figure 7:
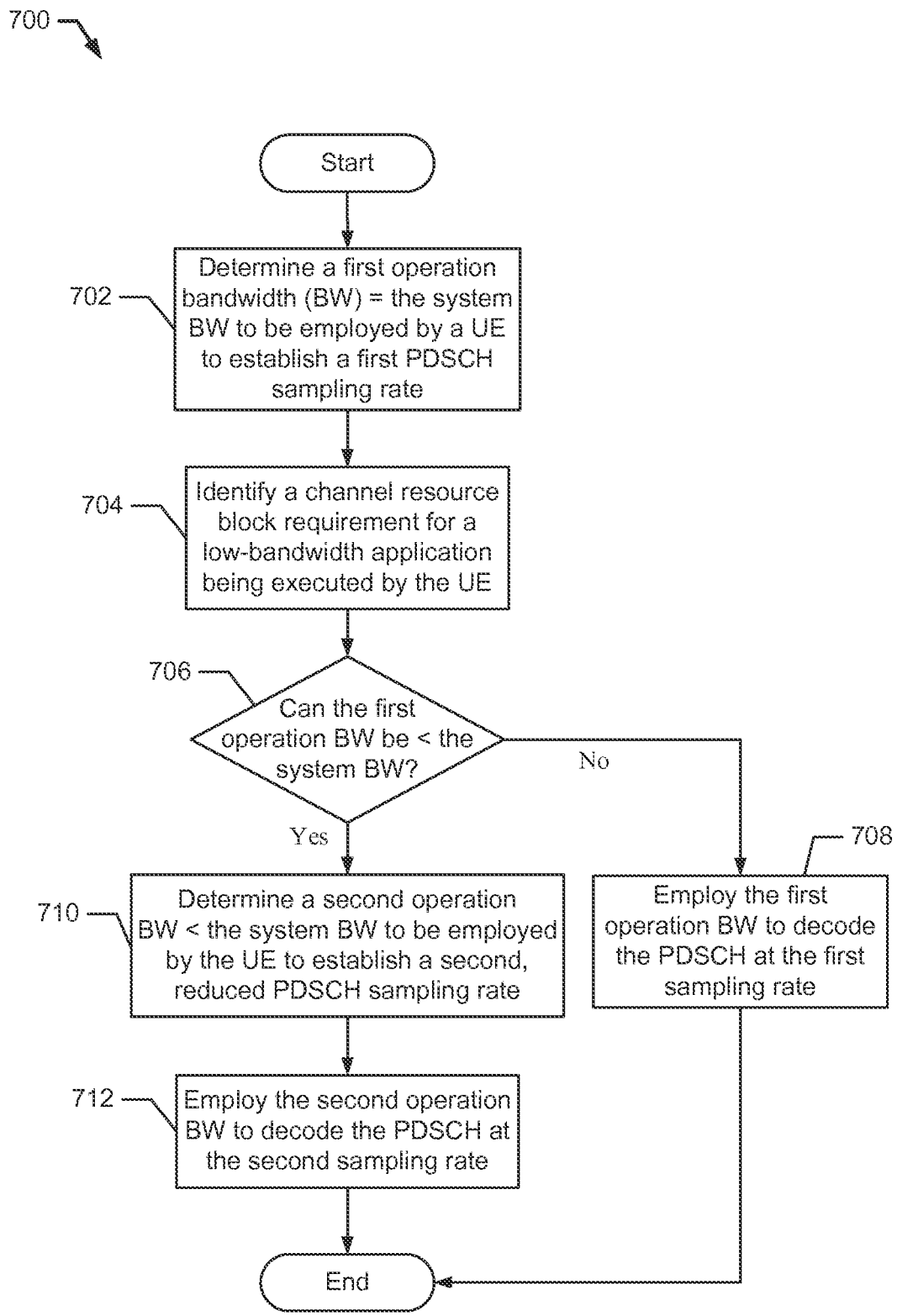
FIG. 7 illustrates a flowchart associated with example methods for establishing application-specific operating bandwidths which can be employed at a UE to perform PDSCH decoding operations in accordance with various embodiments.

FIG. 7 illustrates a flowchart depicting procedures 700 for establishing application-specific operating bandwidths at a UE 400, which can be employed to perform various PDSCH decoding operations in accordance with various embodiments of the disclosure. It should be understood that any of, or all of, the procedures 700 depicted in FIG. 7 may be associated with a method, or methods, that can be implemented by the execution of computer program instructions stored on a non-transitory computer-readable memory 406 of a user communication device 400, and optionally, in conjunction with the execution of computer program instructions stored on a non-transitory computer-readable memory 306 of a network apparatus 300, such as an eNodeB.

In accordance with the 3GPP LTE standard various scalable system bandwidths have been designated as being LTE compliant. These LTE system bandwidths are as follows: 20 MHz (having a 100 RB allocation), 15 MHz (having a 75 RB allocation), 10 MHz (having a 50 RB allocation), 5 MHz (having a 25 RB allocation), 3 MHz (having a 15 RB allocation), and 1.4 MHz (having a 6 RB allocation). In accordance with some embodiments, a UE 400 may be configured to operate its ADC 412 at an operational bandwidth that is equal to a carrier system bandwidth employed within its serving LTE 102 or LTE-A cell 104a-b. In other scenarios a UE 400 may be configured to operate its ADC 412 at an operational bandwidth that is narrower than a carrier system bandwidth employed within its serving LTE 102 or LTE-A cell 104a-b. In this second configuration, the UE 400 may operate its ADC at a downsampled sampling rate.

It should be understood that in an exemplary embodiment, such a downsampled sampling rate may be employed by the ADC of a UE 400 in scenarios where the PDCCH has been disabled and the PDSCH is instead being decoded for DCI information that has been included within the PDSCH payload. In contrast, in a traditional PDCCH decoding scenario (e.g., where the PDCCH includes the relevant DCI information including resource allocation information for the PDSCH), the UE's operating bandwidth would always be set equal the system bandwidth, i.e., to enable decoding of the wide-band PDCCH channel. Alternatively, a downsampled sampling rate may be employed by the ADC of a UE 400 in scenarios where the PDCCH has been disabled because a UE 400 is awaiting an indication that a DCI change will occur in the future, e.g., at a precise or general LTE subframe location(s) as described further herein with respect to FIGS. 10-13. In this scenario, when PDCCH is disabled, a UE 400 can attempt to decode the PDSCH using a downsampled sampling rate.

A determination of which scalable operational bandwidth to employ at a UE 400 may be based on various considerations relating to what application data is being communicated to or from the UE 400. For example, the UE 400 can be configured to initiate any number of different UE-resident applications that may be respectively associated with a particular data type, e.g., streaming audio data, streaming audio-video data, website data, text data, etc., to attempt to transfer IP-based application data via its serving LTE network cell, 102 or 104a-b, over the Internet 112.

Depending on the data type of a corresponding UE application, a network resource requirement (e.g., associated with a requisite number of radio RBs) for communicating the application data may be minimal (e.g., for text or voice data), moderate (e.g., for website webpage data), or substantial (e.g., for streaming audio-video data). Consequently, in some scenarios, one UE application may be associated with a low-bandwidth data type (e.g., VoLTE-type data) having a low RB requirement. In other scenarios, a different UE application may be associated with a moderate to high-bandwidth data type (e.g., streaming audio or video data) having moderate to high RB requirements.

Initially, at operation block 702, a first operation bandwidth (e.g., equivalent to the system bandwidth) to be employed by a UE 400 to establish a default PDSCH sampling rate is determined. For example, a default operation bandwidth for a UE 400 may be set at 10 MHz having an associated resource block requirement of 50 RBs. Subsequently, at operation block 704, a channel RB requirement for a low-bandwidth application being executed by a UE 400 is determined (e.g., a VoLTE application associated with a VoLTE data resource block requirement of 2-3 RBs).

Next, at decision block 706, a determination is made as to whether the first operation bandwidth can be reduced below the system bandwidth based on the determined RB requirement of the low-bandwidth application. In a scenario where it is determined that the first operation bandwidth cannot be reduced below the system bandwidth, at operation block 708, the first operation bandwidth is employed by the UE 400 to decode the PDSCH at the first sampling rate.

However, in a scenario where PDCCH decoding has been disabled, and it is determined that the first operation bandwidth can be reduced below the system bandwidth (e.g., where the VoLTE RB requirement of 2-3 RBs is < the 50 RB allocation at 10 MHz), at operation block 708, a second operation bandwidth that is substantially less than the system bandwidth (e.g., an operation bandwidth of 1.4 MHz having a resource block allocation of 6 RBs) can be employed by the UE 400 to establish a second, reduced PDSCH sampling rate. Subsequently, at operation block 712, the second operation bandwidth can be employed by the UE 400 to decode the PDSCH at the reduced PDSCH sampling rate. In various embodiments, this PDSCH decoding operation is only possible when PDCCH decoding has already been disabled.

In accordance with some embodiments, the second operation bandwidth may be selected by the network after determining the closest system bandwidth to the first operation bandwidth. For example, when the first operation bandwidth is determined to have a 13 RB requirement, the closest system bandwidth will be 3 MHz, which has a 15 RB requirement. In various implementations, the second operation bandwidth can be dynamically set at a bandwidth of 1.4, 3, 5, 10, 15, or 20 MHz, which have respective RB requirements of 6, 15, 25, 50, 75 and 100 RBs, depending on the RB requirement of the data type being communicated. It should be understood that in some configurations, device hardware (e.g., a crystal oscillator and an RF filter within the RF circuitry of a device) may be configured with sufficient resolution that the second operation bandwidth can be set at a similar bandwidth to the first operation bandwidth without substantially affecting device performance.

Figure 8:
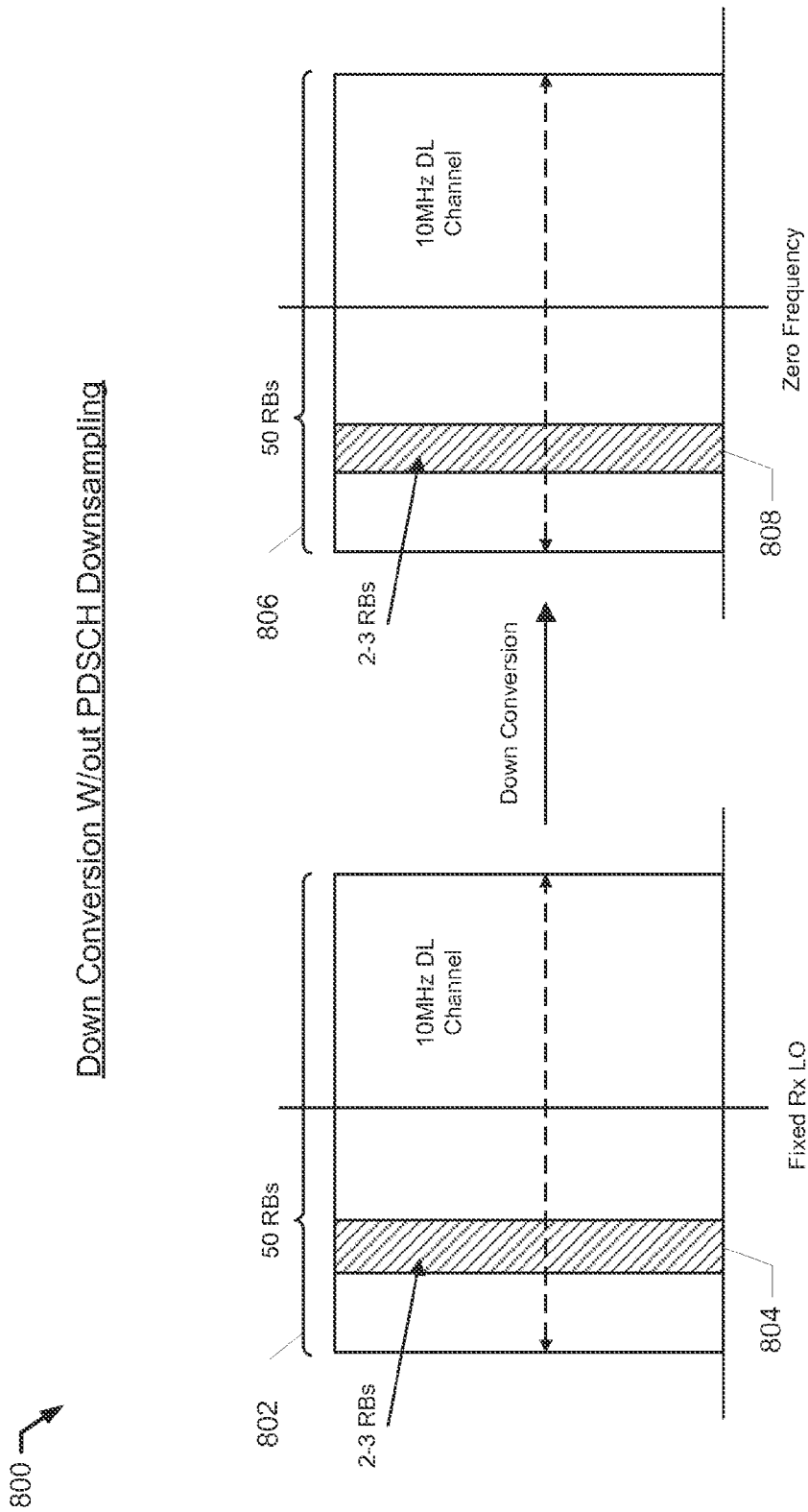
FIG. 8 illustrates a block diagram depicting a fixed receive (Rx) 10 MHz LTE channel down conversion to a zero frequency 10 MHz channel for PDSCH decoding at a UE according to certain implementations of the disclosure.

FIG. 8 illustrates a block diagram 800 depicting a fixed receive (Rx) 10 MHz LTE DL channel 802 down conversion to a zero frequency 10 MHz LTE DL channel for decoding at a UE 400 according to certain implementations of the disclosure. In an embodiment, the UE 400 may employ its LTE modem 410 having the ADC 412 and the RF Filter 414 components to down convert the fixed Rx LO channel to the zero frequency. Notably, the 10 MHz DL channel at the fixed Rx LO has a 50 RB allocation 802, of which, only 2-3 RBs are associated with low-bandwidth application data 804 (e.g., periodic VoLTE-type application data). After the down conversion, the 10 MHz DL channel at the zero frequency maintains a 50 RB allocation 806 that includes the 2-3 RBs of low-bandwidth application data 808.

In this scenario, a significant number of DL radio resources 806 are not needed (e.g., 40+ wasted RBs) to accommodate low-bandwidth, periodic application data 808 (having a low duty cycle), and as such, a UE 400 monitoring and decoding the zero frequency 10 MHz DL channel may waste a significant amount of device resources (e.g., battery power, processing power, available memory, etc.) to try to procure the relevant application data, e.g., from a PDCCH or a PDSCH.

Figure 9:
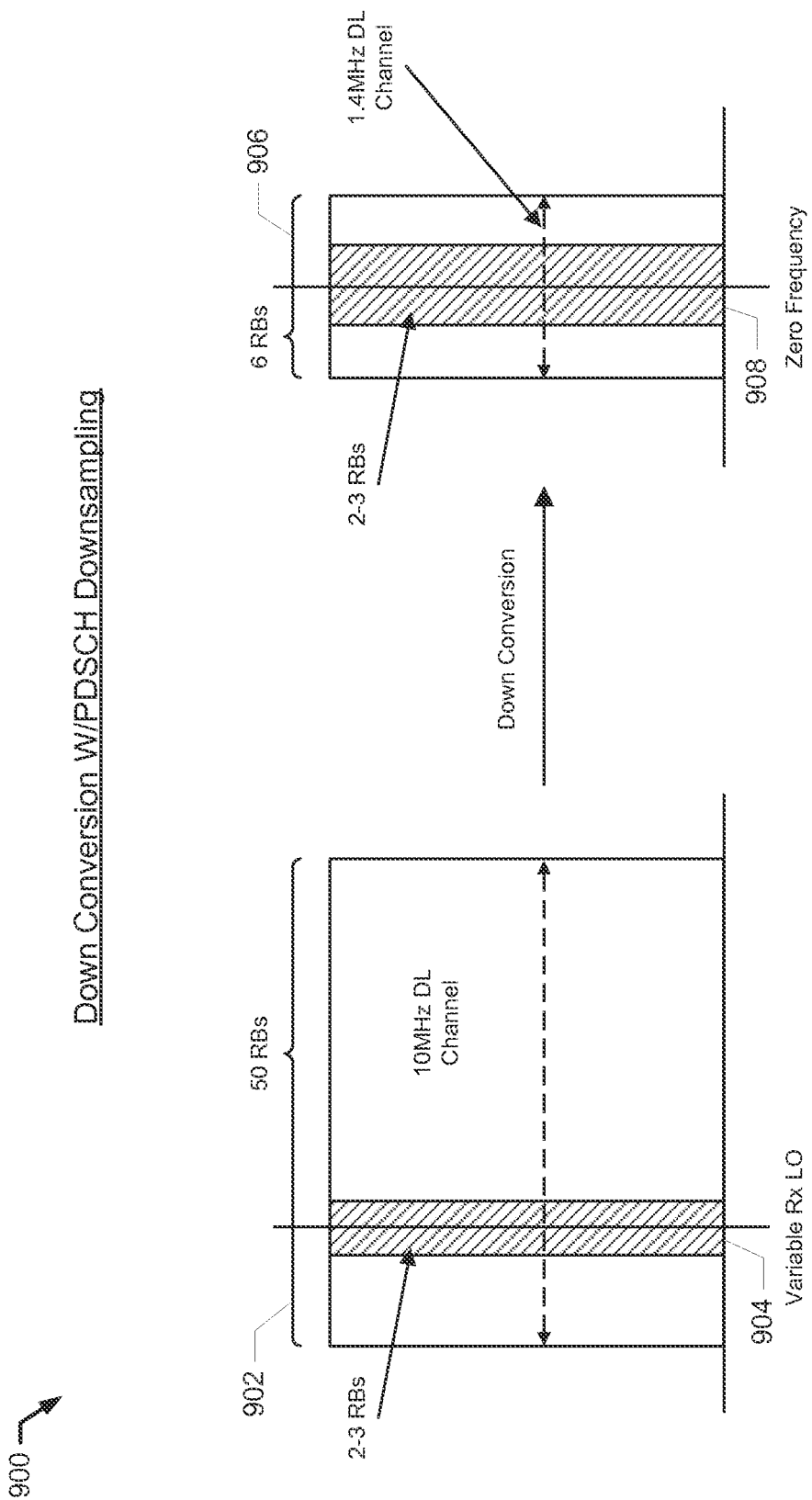
FIG. 9 illustrates a block diagram depicting a variable receive (Rx) 10 MHz LTE channel down conversion to a zero frequency 1.4 MHz channel for downsampled PDSCH decoding at a UE according to some embodiments of the disclosure.

In contrast with the traditional down conversion procedure depicted in the block diagram 800 of FIG. 8, which does not reduce the UE's 400 operating bandwidth below the system bandwidth, FIG. 9 includes a block diagram 900 depicting a variable Rx 10 MHz narrow-band PDSCH channel down conversion to a zero frequency 1.4 MHz PDSCH channel for downsampled PDSCH decoding at a UE 400, according to some embodiments of the disclosure. In an embodiment, the UE 400 may employ its LTE modem 410 having the ADC 412 and the RF filter 414 components to down convert the variable Rx 10 MHz PDSCH channel 902 to the zero frequency 906. In accordance with various embodiments the narrow bandwidth RF filtering via the RF filter 414 can occur after the down conversion procedures.

In this scenario, the bandwidth of PDSCH reception can be significantly reduced, as compared to the previous example described above with respect to FIG. 8. In some implementations, a corresponding RF filter 414 of the UE 400 may be dynamically adjusted (e.g., the RF filter can be opened to only a requisite amount) to allow the UE 400 receive a particular sub-band of data from the zero frequency 1.4 MHz PDSCH channel.

As would be understood by those skilled in the art, the variable Rx LO can be shifted in frequency by simply setting the Rx frequency to center on the low-bandwidth application data resource blocks 904 within the 10 MHz PDSCH channel 902, prior to down conversion to the zero frequency. In this manner, after down conversion, the zero frequency can advantageously be centered on the low-bandwidth application data resource blocks 908 of a smaller 1.4 MHz DL channel 906, which is associated with a reduced operational bandwidth.

Notably, the 10 MHz PDSCH channel 902 centered at the variable Rx LO 904 has a 50 RB allocation, of which, only 2-3 RBs are associated with low-bandwidth application data 904 (e.g., VoLTE application data). After the down conversion, and by employing a new, reduced operational bandwidth of 1.4 MHz, the 1.4 MHz DL channel having a centered (frequency-adjusted) zero frequency includes only a 6 RB allocation 906 with 2-3 RBs of low-bandwidth application data 908. In this scenario, a significant number of DL radio resources 906 are conserved while still accommodating the low-bandwidth, periodic application data 908 (e.g., VoLTE-type application data with a low duty cycle), and as such, a UE 400 monitoring and decoding the centered zero frequency 1.4 MHz PDSCH channel would be able to conserve a significant amount of device resources (e.g., battery power, processing power, available memory, etc.) while attempting to procure relevant application data from the narrow-band PDSCH.

In this scenario 900, a UE 400 can operate its ADC 412 at a reduced sampling rate that is associated with an operational bandwidth corresponding to a system bandwidth of 1.4 MHz (having a minimal RB requirement of only 6 RBs). Further, it should be understood that the location of the 6 RBs of the 1.4 MHz PDSCH channel do not need to be centered around the DC subcarrier. Instead, as described above, the Rx LO can be set to a frequency such that the zero frequency of a down converted baseband signal corresponds to the center of the application data RB allocations. In various embodiments, the UE 400 can attempt to always operate its ADC 412 at the smallest available (downsampled) sampling rate (e.g., corresponding to 1.4 MHz for LTE), unless it receives an indication that a PDSCH allocation has changed or an indication that the UE 400 will need to decode the PDCCH, in which case, the UE 400 may need to open its RF filter 414 to a wider filter bandwidth.

In accordance with some implementations, when a physical hybrid-ARQ indicator channel (PHICH) is detected within the current LTE subframe, it may be necessary for a UE 400 to operate at the designated system bandwidth, e.g., a system bandwidth of 20 MHz, as opposed to a reduced operational bandwidth, e.g., 1.4 MHz. The PHICH in the DL carries Hybrid ARQ (HARQ) acknowledgements (ACK/NACK) for uplink data transfers. As would be understood by those skilled in the art, HARQ procedures typically preempt lower level procedures, and as such, HARQ for low-bandwidth applications (e.g., such as VoLTE applications) having low duty cycles may need to be deactivated to enable a UE 400 to employ a reduced operating bandwidth. Alternatively, it should be understood that in a scenario where PDCCH is deactivated, PHICH information may be included within the PDSCH payload, thereby also consolidating PHICH (ACK/NACK) uplink data transfer information within the PDSCH.

In accordance with various embodiments, it should be understood that PDCCH decoding may occur in conjunction with semi-persistent scheduling (SPS) operations for a UE 400 communicating within an LTE network. In this regard, when an SPS operation is active and running (e.g., as established by a network base station 300) a UE 400 may only need to monitor the PDCCH periodically (e.g., in accordance with the SPS schedule, at every Nth subframe) to determine if a corresponding network assignment or grant has changed. For example, for voice over LTE (VoLTE) communications, the network resource scheduler 312 may set the SPS periodicity at 20 or 40 ms. As such, and in accordance with various implementations described further herein with respect to FIGS. 10-13, when SPS is not active the network resource scheduler 312 of the network apparatus cannot make a DL assignment or an UL grant valid for more than one subframe at a time.

Figure 10:
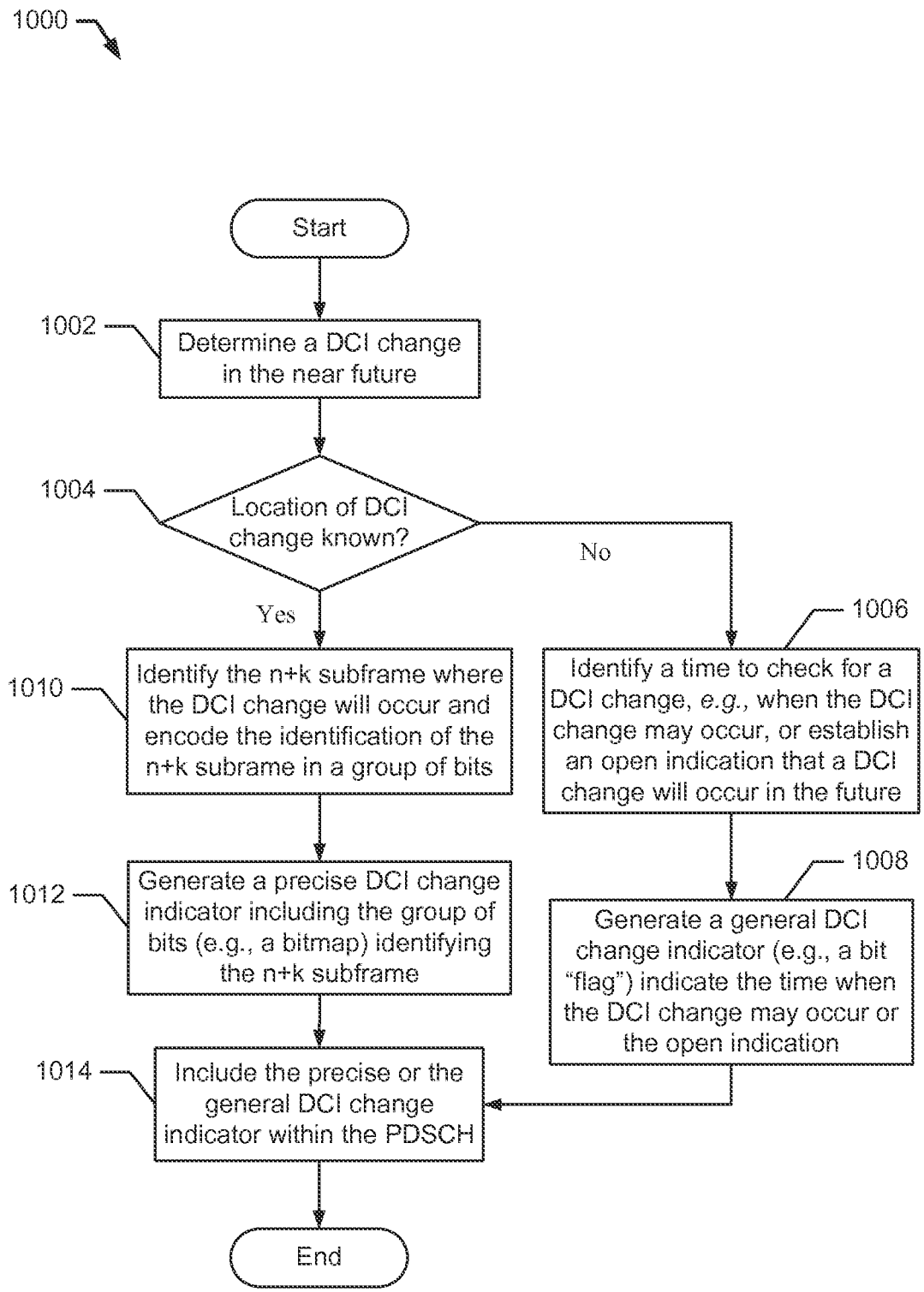
FIG. 10 illustrates a flowchart associated with example methods for generating precise and general PDCCH DCI change indicators for inclusion within a PDSCH in accordance with various implementations.

FIG. 10 illustrates a flowchart depicting procedures 1000 for generating one or more precise DCI change indicators and one or more general DCI change indicators to include within the PDSCH payload, in accordance with some embodiments of the disclosure. It should be understood that any or all of the procedures 1000 depicted in FIG. 10 may be associated with a method, or methods, that can be implemented by the execution of computer program instructions stored on a non-transitory computer-readable memory 306 of a network apparatus 300 (e.g., an eNodeB), and optionally, in conjunction with the execution of computer program instructions stored on a non-transitory computer-readable memory 406 of a user communication device 400.

Initially, at operation block 1002, a network apparatus 300 employing a network resource scheduler 312 having a DL radio resource assignment component 314, such as an eNodeB having RRC functionality, may determine that there is an expected DCI change in the near future (e.g., when there are RB assignment changes for a particular UE 400 in one or more upcoming LTE subframes). Subsequently, at decision block 1004, the network apparatus 300 may determine whether the subframe location of the DCI change is known. In a scenario where the location of the DCI change is unknown, the resource scheduler 312 may be configured to identify a particular time (associated with one or more upcoming subframes) to check for a predicted (best guess) DCI change (e.g., when the DCI change may occur), or alternatively, the resource scheduler 312 may be configured to establish an open indication that a DCI change will occur in the future.

In either scenario, the resource scheduler 312 employing the DL radio resource assignment component 314 can generate a general DCI change indicator (e.g., a bit "flag"), at operation block 1008, that can indicate a time when the DCI change may occur, or alternatively, it can indicate the open indication state to instruct a UE 400 to check for a DCI change, i.e., the UE 400 can monitor every PDCCH after the reception of that indication. However, in a scenario where the location of the DCI change is known in advance, at operation block 1010, the resource scheduler 312 may be configured to identify a particular LTE subframe (e.g., an n+k subframe, where n=the current subframe, and k=an upcoming subframe's location identified by a group of bits) where the DCI change will occur. Further, the resource scheduler 312 may be configured to encode the identification of the n+k subframe in a group of bits (e.g., as a bitmap).

Then, at operation block 1012, the resource scheduler 312 employing the DL radio resource assignment component 314 can generate a precise DCI change indicator including the group of bits (e.g., as a bitmap) that identifies the n+k subframe. Thereafter, at operation block 1014, the resources scheduler 312 can include a generated precise DCI change indicator or a generated general DCI change indicator with the PDSCH (e.g., as part of the PDSCH's payload). As previously discussed, a DCI change indicator included within the payload of a PDSCH can point to a PDCCH subframe location where a DCI is to be decoded by a UE 400. Alternatively, the DCI change indicator included within the payload of a PDSCH may point to a PDSCH subframe location where a DCI is to be decoded by a UE 400.

It should be understood that the primary purpose of including the DCI change indication within the PDSCH is to ensure that the UE 400 will not be required to decode the PDCCH unless the UE 400 receives an explicit indication of a DCI change from a network apparatus 300, such as an eNodeB. In a scenario where the UE 400 receives an explicit indication of a DCI change, the UE 400 can be configured to open its RF filter 414 to operate at the full system bandwidth to decode the wide-band PDCCH, in an effort to procure the relevant DCI information. However, in a scenario where a UE 400 has not yet received an explicit indication of a DCI change, and when the PDCCH is disabled, the UE 400 can instead decode the PDSCH by employing a downsampled sampling rate, e.g., in accordance with the procedures discussed herein with respect to FIGS. 7-9. In this embodiment, the UE 400 can be configured to open its RF filter 414 just wide enough to operate at the reduced operational bandwidth in order to decode the narrow-band PDSCH.

Figure 11:
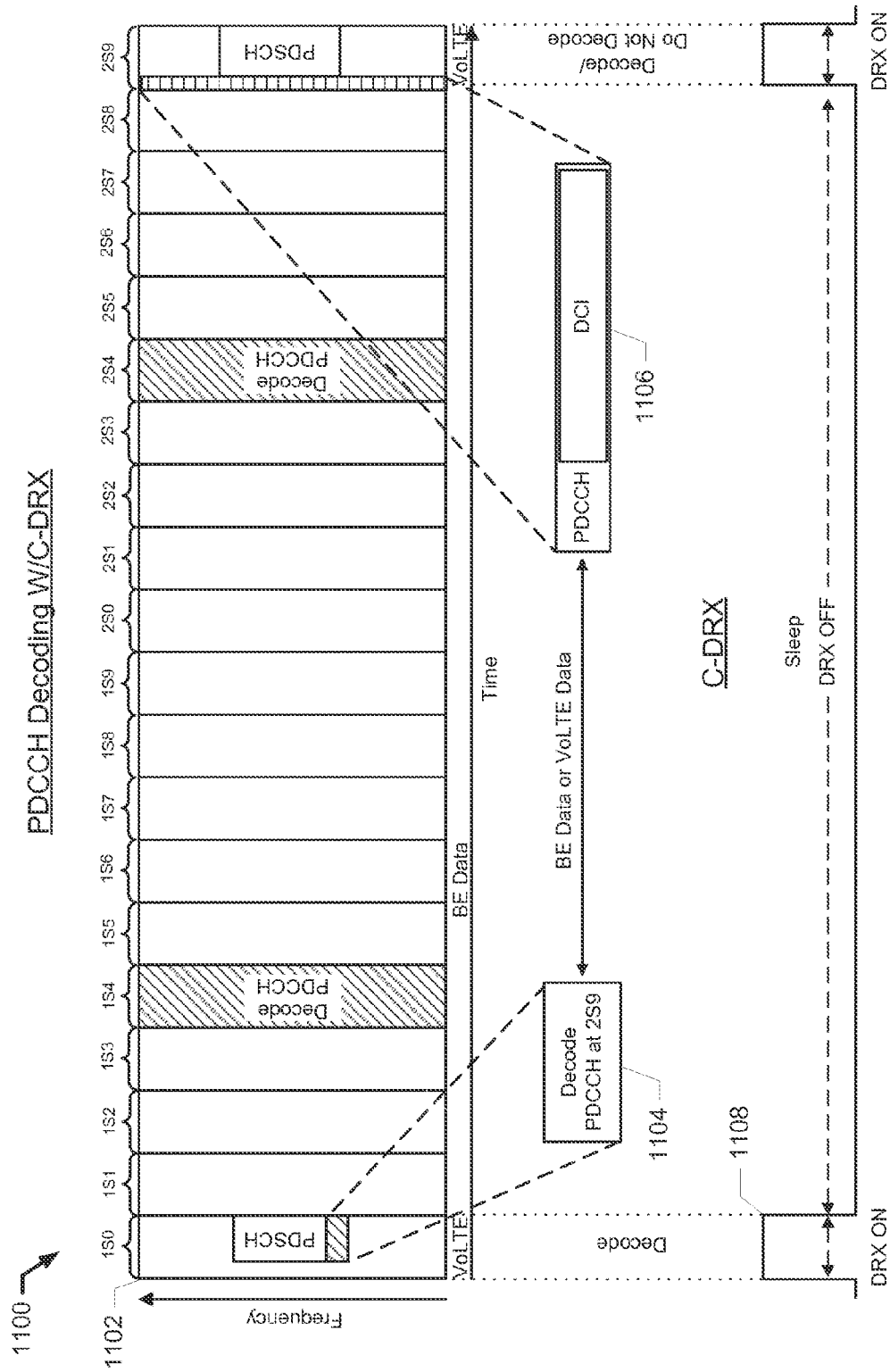
FIG. 11 illustrates a block diagram depicting PDCCH decoding during a continuous discontinuous reception mode (C-DRX) cycle that can be triggered by a PDCCH decode indicator included within the PDSCH according to some implementations of the disclosure.

FIG. 11 illustrates a block diagram 1100 depicting PDCCH decoding operations during a connected mode discontinuous reception (C-DRX) cycle 1108 that may be triggered by a PDCCH decode indicator 1104 within the PDSCH according to some implementations of the disclosure. In some situations, when there is a PDCCH decode indicator 1104 included within the payload of the PDSCH, the PDCCH indicator 1104 will only be valid during one or more corresponding DRX-ON time periods of the C-DRX cycle 1108 that may be associated with one or more upcoming LTE subframes. Conversely, during a DRX-OFF time periods of the C-DRX cycle 1108, which may be associated with multiple ensuing LTE subframes, a PDCCH indicator 1104 would not be valid. As such, a network apparatus 300, such as an eNodeB, employing a resource scheduler 312 can be configured to generate one or more precise PDCCH indicators and/or one or more general PDCCH indicators (as described above) by first considering the periodicity (e.g., the different ON/OFF duration occurrences 1108) of a corresponding C-DRX cycle.

In some embodiments, within a given C-DRX cycle 1108 there can also be reserved subframes (e.g., at 1S4 and 2S4) where the PDCCH is decoded for DCI control information by default, in a scenario where PDCCH decoding will occur only on the reserved subframes (e.g., at 1S4 and 2S4).

Alternatively, a PDCCH configuration containing the location of the PDCCH in the ON duration and the validity of that DCI information may be signaled to a UE 400, either in an radio resource control (RRC) message or a medium access control (MAC) control element (CE) from a network base station 300. The validity/periodicity may be given in terms of a number of C-DRX cycles. In some configurations, during that validity period, the UE will not monitor the PDCCH for the DCI. However, the UE will monitor the PDCCH for the DCI only in specific subframes signaled within the PDCCH configuration during the C-DRX ON duration.

In other scenarios, where communications are being scheduled outside of C-DRX, a network apparatus 300 employing a network resource scheduler 312 would not need to coordinate its resource scheduling according to any C-DRX cycle ON/OFF time periods. In this implementation, the resource scheduler 312 can assign any number of precise PDCCH indicators or generic PDCCH indicators at any subframe location during an RRC connected mode, as C-DRX power saving is not being employed.

With reference to the LTE data frame structure(s) 1102 of FIG. 11, by way of example, two complete 10-subframe LTE data frames have been illustrated, the first LTE frame including a "1S" prefix having 1S(0-9) subframes, and the second LTE frame including a "2S" prefix having 2S(0-9) subframes. In one implementation, the first subframe of the first LTE data frame 150 can include a narrow-band PDSCH that includes a PDCCH indicator 1104 within its payload that may indicate a precise (or general) upcoming subframe location within a 10th subframe of the second LTE frame 2S9, where a UE 400 should attempt to decode the PDCCH including relevant DCI, e.g., for best effort (BE) type data (non-periodic data) or for VoLTE-type data (periodic data) RB assignments.

In various scenarios, the PDCCH indicator 1104 may correspond to one or more LTE subframes in which BE data (high bandwidth data) arrives, or one or more subframes in which a VoLTE data (low bandwidth data) allocation changes. In these scenarios, a UE 400 can open its RF filter(s) 414 wide enough to decode the wide-band PDCCH for the corresponding BE or VoLTE data grant/assignment. In an effort to save UE device 400 resources, the PDCCH indication pertains to a current C-DRX ON time period or a future C-DRX ON time period, thus allowing the UE 400 to sleep during the C-DRX OFF time period, as depicted in FIG. 11.

Figure 12:
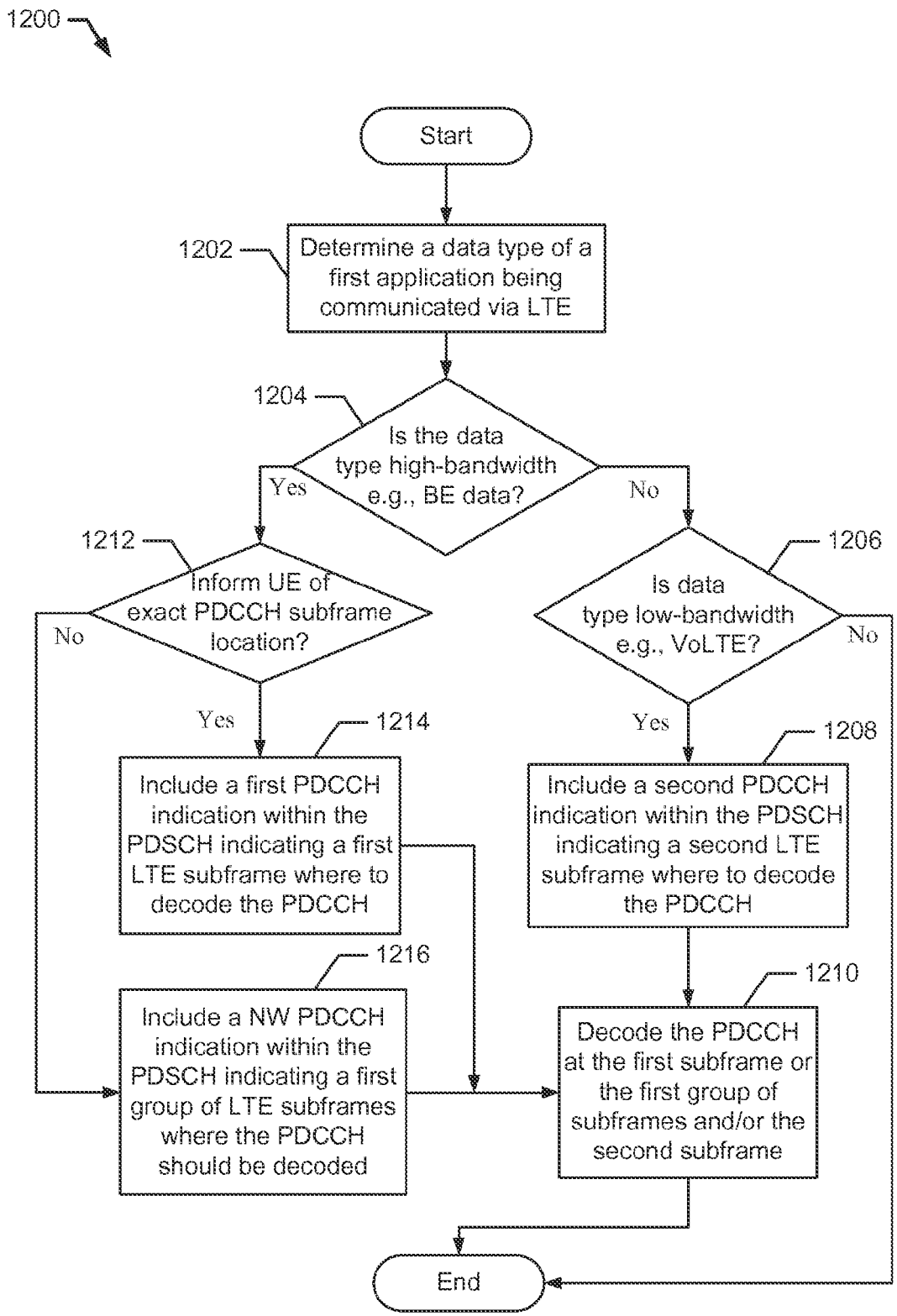
FIG. 12 illustrates a flowchart associated with example methods for identifying various application data types and generating corresponding PDCCH indictors within the PDSCH, and for designating default network PDCCH decode periods in accordance with some embodiments.

FIG. 12 illustrates a flowchart depicting procedures 1200 for identifying various application data types and generating corresponding PDCCH indictors within the PDSCH, and for designating corresponding network PDCCH decode periods in accordance with some configurations. It should be understood that any of, or all of, the procedures 1200 depicted in FIG. 12 may be associated with a method, or methods, that can be implemented by the execution of computer program instructions stored on a non-transitory computer-readable memory 306 of a network apparatus 300 (e.g., an eNodeB), and optionally, in conjunction with the execution of computer program instructions stored on a non-transitory computer-readable memory 406 of a user communication device 400.

Initially, at operation block 1202, a network apparatus 300 employing a network resource scheduler 312 having a DL radio resource assignment component 314, such as an eNodeB having RRC functionality, can determine a data type of a first UE-resident application being communicated via LTE. Specifically, at decision block 1204, a determination is made as to whether the data type associated with the first application is high-bandwidth, such as non-periodic BE data. In a scenario where the data type of the first application is determined to be high-bandwidth BE data, a determination can be made, at decision block 1212 as to whether to inform the UE 400 of the exact/precise subframe location of the PDCCH.

When the network apparatus 300 employing a network resource scheduler 312 makes a decision to inform the UE 400 of the exact PDCCH subframe location, at operation block 1214, a first PDCCH indication can be generated and included within the PDSCH payload, which indicates a first LTE subframe location where the UE 400 is to attempt to decode the PDCCH (e.g., according to a group of bits or a bitmap, as described above). Thereafter the process proceeds to operation block 1210. Alternatively, when the network apparatus 300 employing the network resource scheduler 312 decides not to (or is otherwise unable to) inform a UE 400 of the exact PDCCH subframe location, at operation block 1216, the network apparatus 300 can include a PDCCH indication (e.g., a general PDCCH indication) within the PDSCH indicating a first group of LTE subframes where the UE 400 should attempt to decode the PDCCH. Thereafter the process proceeds to operation block 1210. In accordance with some embodiments, various PDCCH decode indictors may be communicated to a UE via RRC signaling, via a MAC CE, etc., without departing from the spirit and scope of the invention.

In a scenario where the data type of the first application is determined not to be high-bandwidth, a determination can be made, at decision block 1206, as to whether the data type is low-bandwidth, such as periodic VoLTE data. In a scenario where the first data type is determined to be low-bandwidth, the process can proceed to operation block 1208 where a second PDCCH indication is included within the PDSCH to a indicate a second LTE subframe (or a group of LTE subframes) where the UE 400 is to attempt to decode the PDCCH.

Subsequently, at operation block 1210, a UE 400 receiving the first PDCCH indication (e.g., for BE data), the NW PDCCH indication (e.g., for BE data), or the second PDDCH indication (e.g., for VoLTE data), can decode the PDCCH at either the first LTE subframe, the first group of LTE subframes, or the second LTE subframe to attempt to decode the PDCCH for DCI information corresponding to either BE or VoLTE type data. It should be understood that, although only BE-type data and VoLTE-type data were described with reference to FIG. 12, any other data type may be evaluated within the context of the flow diagram procedures 1200 of FIG. 12, without departing from the spirit and scope of this disclosure.

Figure 13:
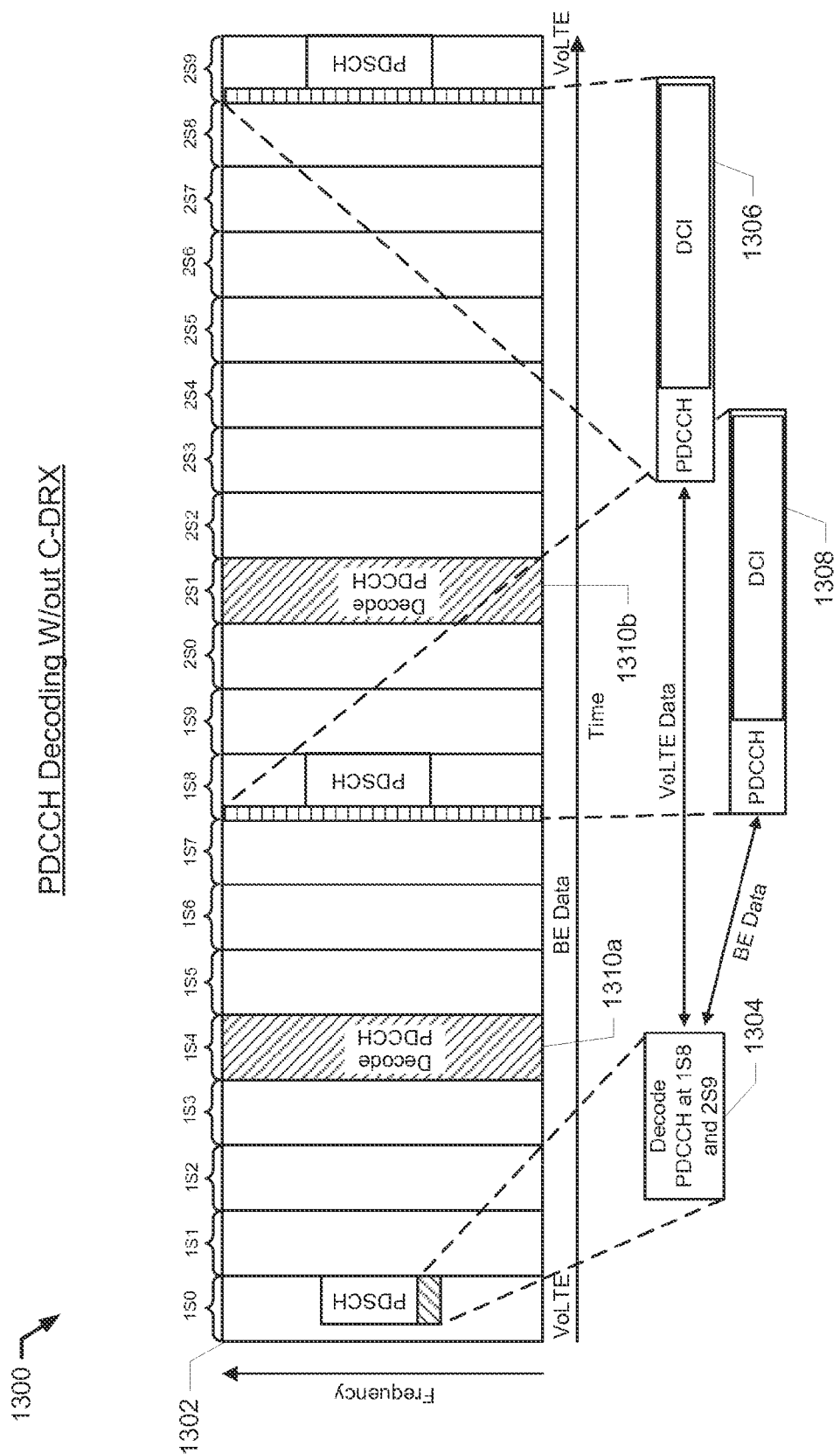
FIG. 13 illustrates a block diagram depicting PDCCH decoding during traffic associated with different application data types that can be triggered by a one or more application-specific PDCCH decode indicator(s) to be included within the PDSCH or by designating network PDCCH decode periods according to various implementations.

FIG. 13 illustrates a block diagram 1300 depicting PDCCH decoding during traffic associated with different application data types (e.g., BE application data and VoLTE data) that can be triggered by a one or more application-specific PDCCH decode indicator(s) 1304, which may be included in the payload PDSCH (e.g., in the manner described above), or by designating specific (default) network PDCCH decode periods (1310*a-b*), according to various implementations of the disclosure. However, it should be understood, that unlike the PDCCH decoding operations described above with respect to the block diagram 1100 of FIG. 11, the PDCCH decoding operations described herein with respect to the block diagram 1300 of FIG. 13, does not take place during, or in conjunction with, a C-DRX cycle that includes both DRX-ON and DRX-OFF time periods. Further, in accordance with some embodiments, one or more PDCCH decode indictors may be communicated to a UE 400 via RRC signaling, via a MAC CE, etc., as opposed to being communicated to the UE within the payload of the PDSCH, without departing from the spirit and scope of the disclosure.

With reference to the LTE data frame structure(s) 1302 of FIG. 13, by way of example, two complete 10-subframe LTE data frames have been illustrated, the first LTE frame including a "1S" prefix having 1S(0-9) subframes, and the second LTE frame including a "2S" prefix having 2S(0-9) subframes. In one implementation, the first subframe of the first LTE data frame 150 can include a narrow-band PDSCH that may include a PDCCH indicator(s) 1304 within its payload that may indicate both:

1) a precise (or general) upcoming subframe location within a 4rth subframe of the first LTE frame 1S4, where a UE 400 should attempt to decode the PDCCH 1308 including relevant DCI, e.g., for non-periodic BE type data RB assignments; and 2) a precise (or general) upcoming subframe location within a 10th subframe of the second LTE frame 2S9, where a UE 400 should attempt to decode the PDCCH 1306 including relevant DCI, e.g., for periodic VoLTE type data RB assignments.

However, it should be understood that the 1S4 and the 2S9 subframes are merely given as examples, the precise (or general) subframe locations can vary depending on a particular implementation. In general, there needs to be some configuration that will signal to the UE 400 a location where to decode the PDCCH.

Additionally, in various embodiments, the network apparatus 300 including the network resource scheduler 312, may employ its DL radio resource assignment component 314 to establish specific (default) network PDCCH decode periods (1310a-b) where the resource scheduler 312 determines that non-periodic BE data should be decoded. In some situations, these default BE data decode periods may be associated with an entire subframe or with multiple ensuing subframes (e.g., the fourth subframe of the first LTE data frame 1S4 and/or the second subframe of the second LTE data frame 2S1) as designated by the network apparatus 300 to the UE 400. According to some embodiments, a corresponding UE 400 may be required to decode data of the entire 1S4 and 2S1 subframes for PDCCH DCI information.

It should be understood that subframe location(s) for BE data may be fixed and that this information is established, and coordinated, between a UE 400 and a corresponding serving network apparatus 300, such as an eNodeB. Accordingly, these predefined subframes may be referred to as "BE-subframes," and their locations can be indicated within an RRC message from an eNodeB 300 to a UE 400 (e.g., at subframes S2, S4, S6, and S8). In this scenario, a network apparatus 300, such as an eNodeB, can be configured to send a PDCCH indicator to the UE 400, to notify the UE 400 that there is an upcoming DCI change, when the UE 400 will need to decode the PDCCH at particular LTE subframe locations that are indicated in the RRC message (e.g., at subframes S2, S4, S6, and S8) to learn the DCI information. Alternatively, the network apparatus 300 (e.g., the eNodeB 300) may simply indicate to the UE 400 that the PDCCH is going to change at a specific subframe (e.g., within subframe S4).

Notably, with VoLTE there are some scenarios where there is no need for a network apparatus 300 (e.g., an eNodeB) to specify particular subframes for decoding PDCCH, because VoLTE traffic is periodic, occurring only at known communication intervals. As such, a UE 400 that is aware of the VoLTE communication's periodicity may receive an indication of a PDCCH change from a network apparatus 300 that does not identify a specific subframe location where the UE 400 is to attempt to decode the PDCCH; however, in some scenarios, the UE 400 can attempt to decode the PDCCH at a particular VoLTE communication subframe(s) based on its known periodicity. Additionally, the UE 400 can also be instructed to attempt to decode the PDCCH during subsequent VoLTE communication periods. In this scenario, it should be understood that although the periodicity of the VoLTE communication is known by the UE 400, the exact location of the PDCCH within the periodicity may be fixed.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for allocating network resources for a user equipment (UE) communicating within a Long Term Evolution (LTE) network, the method comprising:

at a network apparatus:
   identifying an expected downlink control information (DCI) change for the UE;
   determining whether an LTE subframe location for the DCI change is known;
   in response to determining, generating a DCI change indicator; and
   sending the DCI change indicator to the UE on a physical downlink shared channel (PDSCH) to instruct the UE where to decode a physical downlink control channel (PDCCH) for a DCI,
   wherein the DCI change indicator comprises:
      a general DCI change indicator when the LTE subframe location for the DCI change is not known, or
      a precise DCI change indicator when the LTE subframe location for the DCI change is known.

2. The method of claim 1, further comprising:
   determining that the LTE subframe location for the DCI change is not known; and in response to determining, generating the general DCI change indicator for the UE.

3. The method of claim 2, wherein the general DCI change indicator is sent to the UE as a bit flag identifying a time associated with one or more upcoming LTE subframes when the UE is required to decode the PDCCH for the DCI.

4. The method of claim 2, wherein the general DCI change indicator is sent to the UE as a bit flag including an open indication that requires the UE to decode the PDCCH at least until the DCI is acquired by the UE.

5. The method of claim 1, further comprising:
determining that the LTE subframe location for the DCI change is known; and
in response to determining, generating precise DCI change indicator for the UE.

6. The method of claim 5, wherein the precise DCI change indicator is sent to the UE as a bitmap identifying a particular upcoming LTE subframe where the UE is required to decode the PDCCH for the DCI.

7. The method of claim 1, wherein:
the DCI change indicator is sent to the UE within a payload portion of a PDSCH communication; and
the DCI corresponds to a voice over LTE (VoLTE) data or a best effort (BE) data network allocation change for the UE.

8. The method of claim 1, wherein the DCI change indicator identifies one or more upcoming LTE subframes that occur during an ON duration of a connected mode discontinuous reception (C-DRX) cycle of the UE.

9. A mobile device, comprising:
at least one transceiver configurable to communicate via a long term evolution (LTE) network;
one or more processors; and
a storage device storing executable instructions that, when executed by the one or more processors, cause the mobile device to:
decode a physical downlink shared channel (PDSCH);
acquire a downlink control information (DCI) change indicator from a payload portion of a PDSCH communication; and
decode a physical downlink control channel (PDCCH) for a DCI based on the DCI change indicator,
wherein the DCI change indicator indicates when the mobile device is required to decode the PDCCH for the DCI and comprises:
a general DCI change indicator that (i) identifies a time associated with one or more upcoming LTE subframes or (ii) includes an open indication to decode the DPCCH at least until the DCI is acquired, or
a specific DCI change indicator that identifies a particular upcoming LTE subframe.

10. The mobile device of claim 9, wherein the DCI change indicator comprises the general DCI change indicator that identifies the time associated with the one or more upcoming LTE subframes when the mobile device is required to decode the PDCCH for the DCI.

11. The mobile device of claim 9, wherein the DCI change indicator comprises the general DCI change indicator that includes the open indication requiring the mobile device to decode the PDCCH at least until the DCI is acquired by the mobile device.

12. The mobile device of claim 9, wherein the DCI change indicator comprises the specific DCI change indicator that includes a bitmap identifying the particular upcoming LTE subframe where the mobile device is required to decode the PDCCH for the DCI.

13. The mobile device of claim 9, wherein:
there are one or more reserved LTE subframes that occur during an ON duration of a connected mode discontinuous reception (C-DRX) cycle of the mobile device requiring the mobile device to decode the PDCCH without a DCI change indication;
the DCI change indicator is valid for multiple ON durations of the C-DRX cycle of the mobile device; and
the DCI decoded from the PDCCH based on the DCI change indicator is valid for multiple ON durations of the C-DRX cycle of the mobile device.

14. The mobile device of claim 9, further comprising a PDCCH timer,
wherein execution of the executable instructions further causes the mobile device to start the PDCCH timer to designate a do-not-decode period that prevents the mobile device from decoding the PDCCH during the do-not-decode period.

15. The mobile device of claim 14, wherein execution of the executable instructions further causes the mobile device to:
determine when the PDCCH timer has expired; and
in response to determining, decode the PDCCH until the PDCCH timer is restarted.

16. The mobile device of claim 14, wherein execution of the executable instructions further causes the mobile device to:
receive a new DCI change indicator on the PDSCH during the do-not-decode period; and
in response to receiving the new DCI change indicator, decode the PDCCH during the do-not-decode period in accordance with the DCI change indicator,
wherein the PDCCH timer is specified in terms of a number of connected mode discontinuous reception (C-DRX) cycles for the mobile device.

17. A non-transitory computer-readable medium storing executable instructions that, when executed by one or more processors of a network apparatus, cause the network apparatus to:
identify an expected downlink control information (DCI) change for a mobile device;
determine whether an LTE subframe location for the DCI change is known;
in response to determining, generate a DCI change indicator; and
send the DCI change indicator to the mobile device on a physical downlink shared channel (PDSCH) to instruct the mobile device where to decode a physical downlink control channel (PDCCH) for a DCI,
wherein the DCI change indicator comprises:
a general DCI change indicator when the LTE subframe location for the DCI change is not known, or
a precise DCI change indicator when the LTE subframe location for the DCI change is known.

18. The non-transitory computer-readable medium of claim 17, wherein:
the DCI change indicator comprises the general DCI change indicator for the mobile device; and
the general DCI change indicator is sent to the mobile device as a bit flag that:
i. identifies a time associated with one or more upcoming LTE subframes when the mobile device is required to decode the PDCCH for the DCI; or
ii. includes an open indication requiring the mobile device to decode the PDCCH at least until the DCI has been acquired by the mobile device.

19. The non-transitory computer-readable medium of claim 17, wherein:
- the DCI change indicator comprises the precise DCI change indicator for the mobile device; and
- the precise DCI change indicator is sent to the mobile device as a bitmap that identifies a particular upcoming LTE subframe where the mobile device is required to decode the PDCCH for the DCI.

20. The non-transitory computer-readable medium of claim 17, wherein the DCI change indicator identifies one or more upcoming LTE subframes that occur during an ON duration of a connected mode discontinuous reception (C-DRX) cycle of the mobile device where PDCCH needs to be decoded.

* * * * *

UNITED STATES PATENT AND TRADEMARK OFFICE
CERTIFICATE OF CORRECTION

PATENT NO. : 9,445,429 B2  
APPLICATION NO. : 14/502507  
DATED : September 13, 2016  
INVENTOR(S) : Tabet et al.

Page 1 of 1

It is certified that error appears in the above-identified patent and that said Letters Patent is hereby corrected as shown below:

In the Drawings

Sheet 3, Fig. 3: "LTE Modem/Trancevier(s) 310" should read -- LTE Modem/Transceiver(s) 310 --.

Sheet 4, Fig. 4: "LTE Modem/Trancevier(s) 410" should read -- LTE Modem/Transceiver(s) 410 --.

Signed and Sealed this
Twenty-third Day of January, 2018

Joseph Matal
*Performing the Functions and Duties of the
Under Secretary of Commerce for Intellectual Property and
Director of the United States Patent and Trademark Office*